(12) United States Patent
Cheolas et al.

(10) Patent No.: US 6,793,855 B2
(45) Date of Patent: Sep. 21, 2004

(54) POLYISOCYANURATE COMPOSITIONS AND COMPOSITES

(75) Inventors: Evan H. Cheolas, Sterling Heights, MI (US); Berend Eling, Bertem (BE); Ravi R Joshi, Auburn Hills, MI (US)

(73) Assignee: Huntsman International LLC, Salt Lake City, UT (US)

( * ) Notice: Subject to any disclaimer, the term of this patent is extended or adjusted under 35 U.S.C. 154(b) by 317 days.

(21) Appl. No.: 09/858,377

(22) Filed: May 16, 2001

(65) Prior Publication Data

US 2002/0045690 A1 Apr. 18, 2002

Related U.S. Application Data

(63) Continuation of application No. PCT/US99/26854, filed on Nov. 12, 1999.
(60) Provisional application No. 60/108,611, filed on Nov. 16, 1998, and provisional application No. 60/108,611, filed on Nov. 16, 1998.

(51) Int. Cl.[7] ............................................. B29C 47/00
(52) U.S. Cl. ................... 264/137; 264/331.16; 156/180
(58) Field of Search ................................. 524/194, 217, 524/218; 156/180; 428/295.4; 264/136, 137, 331.16

(56) References Cited

U.S. PATENT DOCUMENTS

| | | | |
|---|---|---|---|
| 3,711,444 A | | 1/1973 | Allen et al. |
| 4,124,573 A | | 11/1978 | Watabe et al. |
| 4,126,742 A | | 11/1978 | Carleton et al. |
| 4,540,781 A | * | 9/1985 | Barsa .......................... 544/193 |
| 4,711,912 A | | 12/1987 | Snider et al. |
| 5,071,939 A | | 12/1991 | Fukami et al. |
| 5,294,461 A | * | 3/1994 | Ishida ........................ 427/293 |
| 5,314,983 A | * | 5/1994 | DeMeuse et al. ............. 528/73 |
| 5,788,013 A | * | 8/1998 | Fu-Chung .................... 184/74 |
| 6,043,313 A | * | 3/2000 | Brink et al. ................. 524/589 |
| 6,262,217 B1 | * | 7/2001 | Tallmadge et al. ............ 528/64 |
| 6,420,493 B1 | * | 7/2002 | Ryckis-Kite et al. ....... 525/440 |
| 2002/0031664 A1 | * | 3/2002 | Kaiser et al. ............... 428/371 |

* cited by examiner

*Primary Examiner*—Mark Eashoo
(74) *Attorney, Agent, or Firm*—Nicole Graham

(57) ABSTRACT

The invention relates to polyisocyanurate systems, pultrusion of those systems to produce reinforced polyisocyanurate matrix composites, and to composites produced thereby. The polyisocyanurate systems include a polyol component, an optional chain extender, and an isocyanate. The polyisocyanurate systems have extended initiation times of about 5 minutes to about 30 minutes at room temperature, and can be snap cured.

23 Claims, No Drawings

POLYISOCYANURATE COMPOSITIONS AND COMPOSITES

This application is a continuation of international application number PCT US99/26854, filed Nov. 12, 1999.

This application claims the benefit of No. 60/108,611 filed on Nov. 16, 1998 and No. 60/108,612 filed on Nov. 16, 1998.

TECHNICAL FIELD

The invention relates to polyisocyanurate systems, fiber reinforced polyisocyanurate matrix composites, and manufacture of those composites by pultrusion.

BACKGROUND ART

Pultrusion is a highly cost effective method for making fiber reinforced, resin matrix composites. The primary raw materials used in pultrusion are resin and reinforcement. Fillers and additives such as calcium carbonate, clay, mica, pigments, UV stabilizers can be added to the resin to enhance the physical, chemical and mechanical properties of the pultruded product.

Pultrusion is typically done by the injection die or open bath process. The open bath process is the most common. The injection die process, however, is gaining importance due to environmental concerns about the large amounts of volatile contaminants released in the open bath process.

In a typical open bath process, reinforcement material in the form of fibers, mat or roving is pulled continuously through an open bath of resin to produce an impregnated reinforcement. The impregnated reinforcement is pulled through form plates to remove excess resin, and then through a curing die to cure the resin and yield a finished product.

In the injection die pultrusion process, reinforcement material is passed through a closed injection die that has resin injection ports. The resin is injected under pressure through the ports to impregnate the reinforcement material. The impregnated reinforcement is pulled through the injection die to produce a shaped product.

Resins which have been used in the open bath and injection die methods of pultrusion include thermoset resins such as unsaturated polyester, epoxy, phenolics, methacrylates and the like, as well as thermoplastic resins such as PPS, ABS, Nylon 6. Blocked polyurethane prepolymers also have been used. Polyester and epoxy resins are generally slower reacting than polyisocyanurates. In addition, the use of blocked polyurethane resins in pultrusion has the disadvantage of deblocking of the isocyanate which creates environmental concerns.

A need therefore exists for resins such as polyisocyanurate and polyurethane resins which may be used in pultrusion, especially injection die pultrusion, without these disadvantages.

DISCLOSURE OF THE INVENTION

The invention relates to polyisocyanurate systems, preferably miscible polyisocyanurate systems, having an isocyanate component and a polyol component. The polyol component includes any of polyester polyols and polyether polyols. One or more polyester polyols may be blended with one or more polyether polyols in any ratio for use in the polyol component.

The polyether polyols have a functionality of about 2 to about 6 and a molecular weight of about 300–6000. The polyol component also includes a catalyst capable of initiating both a urethane and an isocyanurate reaction. The isocyanate can be an isocyanate prepolymer. The isocyanate and the polyol component can be present in a ratio of about 0.3 to about 9.0 in an amount sufficient to yield an index of about 200 to about 900.

The polyol component also can include a chain extender such as glycerols and diols having at least about 2 hydroxyl groups and a molecular weight less than about 300. When a chain extender is present, the polyol may be present in an amount of up to about 1–99% and the chain extender may be may be present in an amount of up to about 1–99% based on total weight of the polyol component.

A preferred polyisocyanurate system includes an isocyanate component and a polyether polyol component where the polyether polyol is polyethylene oxide capped polypropylene oxide polyether polyol having ethylene oxide content of about 21%, a functionality of 2, and a hydroxyl value of 30 mg KOH/gm, the chain extender is dipropylene glycol, and the isocyanate is a mixture of 2,4' MDI,4,4' MDI and pMDI having about 19.5% 2,4'-MDI, 60.9% 4,4'-MDI, about 19.6% p-MDI, and an NCO value of 32.5. The polyisocyanurate systems, at an index of from about 300 to about 700 fully cure at 120–140 C. with an isocyanate conversion of about 90%. Another preferred polyisocyanurate system includes an isocyanate component and a polyether polyol component where the polyether polyol is PPG425 and the isocyanate is a mixture of 2,4' MDI,4,4' MDI and pMDI having about 19.5% 2,4'-MDI, 60.9% 4,4'-MDI, about 19.6% p-MDI, and an NCO value of 32.5.

The invention also relates to a pultrusion process for preparing a cured polyisocyanurate fiber reinforced polymer composite. The process entails pulling continuous fibers through an impregnation die, supplying a polyol component having a catalyst capable of initiating both a urethane reaction and a isocyanurate reaction, and an isocyanate component to a static mixer to produce a polyisocyanurate reaction mixture and feeding the reaction mixture to the impregnation die, contacting the fibers with the precursor mixture in the impregnation chamber for a time period and at a temperature sufficient to cause substantial polymerization of the reaction mixture within the impregnation chamber to produce a composite of fibers coated by the polyisocyanurate reaction mixture, directing the composite of coated fibers through a heated curing die to at least partially cure the polyisocyanurate reaction mixture to produce a solid fiber reinforced polyisocyanurate matrix composite, and drawing the cured composite from the die. The temperature in the impregnation chamber is less than the temperature required to initiate a polyisocyanurate reaction. The fibers are at ambient temperature before they enter the impregnation die. The fibers and the reaction mixture are supplied concurrently to the impregnation die. During pultrusion, the polyisocyanurate reaction mixture may be present in the injection die for less than about 50 seconds.

The polyisocyanurate systems of the invention are two component systems. Mixing of the two components can be achieved by using a static or dynamic mixer. A static mixer is preferred. Type I and Type II miscible two component polyisocyanurate systems are preferred.

Having summarized the invention, the invention will now be described in detail by reference to the following disclosure and non-limiting examples.

MODES FOR CARRYING OUT THE INVENTION

Glossary

The following names and abbreviations are understood to have the meanings defined below:

1. 1,4 BD is 1,4 butane diol;
2. 1,3 BD is 1,3 butane diol;
3. 2,3 BD is 2,3 butane diol;
4. 1,2 PD is 1,2 propane diol;
5. 2m 1,3 PD is 2-methyl-1,3-propane diol;
6. BiCat 8 is Bismuth-Zinc Neodeconate from Shepherd Chemical Co.;
7. Dabco DC 1027 is 30% triethylenediamine (TEDA) in Ethylene. Dabco 33LV is TEDA in DPG from Air Products and Chemicals, Allentown, Pa.
8. Dabco K15 is a catalyst of a potassium salt in a glycol from Air Products and Chemicals, Allentown, Pa.;
9. Dabco T-12 is 100% dibutyl tin dilaurate from Air Products and Chemicals, Allentown, Pa.;
10. Dabco T-45 is a potassium carboxylate catalyst from Air Products and Chemicals, Allentown, Pa.;
11. Dabco TMR is a tetra alkylammonium 2-ethylhexonate dissolved in DPG, from Air Products.;
12. Fomrez UL-29 is a mixture of octylmercapto acetate in a polyol carrier available from Witco Corporation, Greenwich, Conn.;
13. DEG is diethylene glycol;
14. DPG is dipropylene glycol;
15. Glycerin is 99.5% pure trihydroxy alcohol from Quaker Chemical Co.;
16. Isocyanate A is polymeric MDI having an MDI content of about 44 wt. % and an NCO value of about 30.7 from Huntsman Polyurethanes;
17. Isocyanate B is uretonimine modified 4,4' MDI having an NCO value of 29 from Huntsman Polyurethanes;
18. Isocyanate C is a mixture of 2,4' MDI,4,4MDI and pMDI having about 9.4% 2,4'-MDI, 60.9% 4,4'-MDI, about 29.7% p-MDI, and an NCO value of 32.1 from Huntsman Polyurethanes.
19. Isocyanate D is a mixture of 2,4' MDI,4,4' MDI and pMDI having about 19.5% 2,4'-MDI, 60.9% 4,4'-MDI, about 19.6% p-MDI, and an NCO value of 32.5 from Huntsman Polyurethanes.
20. Isocyanate E is a softblock MDI prepolymer formed from an EO capped polyoxypropylene diol having a molecular weight of 3740 and EO cap level of 27.1%, remainder polypropylene oxide, and which is 39.7 wt. % of the total prepolymer, 6% of the total prepolymer is a uretonimine carbodiimide modified pure 4,4' MDI having an NCO content of 29.3%, and the remainder of the prepolymer is a mixture of 4,4' and 2,4' MDI in which the 2,4 MDI is about 2.2–2.8% of the mixed isomer stream, the softblock prepolymer having an NCO of 18.9–19.3 and a viscosity at 25 C. of 300–375 cps from Huntsman Polyurethanes.
21. Kemester 5721 from Witco Corporation, Greenwich, Conn. is tridecyl stearate.
22. LC-5615 is nickel acetylacetonate from OSI Specialties;
23. LHT 240 is a polyether polyol from Arco Chemical Co.
24. Loxiol G71S is the reaction product of adipic acid, pentaerythritol, and oleic acid, having an acid number less than 15 and an hydroxyl number less than 15 from Henkel Corp., Kankakee, Ill.;
25. LuWax OP is a solid montanic ester wax from BASF Corp.
26. MDI is diphenylmethane diisocyanate;
27. MEG is monoethylene glycol;
28. Munch 7027/A is a fatty acid ester derivative internal mold release agent from Munch Co, Germany;
29. Munch 7016 is a fatty acid ester derivative internal mold release agent from Munch Co, Germany;
30. Munch 0669/1BB is a fatty acid ester derivative internal mold release agent from Munch Co, Germany;
31. Niax L 5440 is a silicone surfactant that includes polyalkylenoxidimethyl siloxane copolymer available from Union Carbide, Sisterville, W.Va.
32. Polymeric MDI is defined as a blend of 2,2' MDI, 2,4' MDI, and 4,4' MDI diisocyanates, where 4,4' MDI is the predominate isomer, the remainder being isocyanates having a functionality greater than 3. The weight ratio of diisocyanates to higher functionality isocyanates varies from 70:30 to 30:70.
33. Polyol A is polyethylene oxide capped polypropylene oxide polyether polyol having ethylene oxide content of about 21%, a functionality of 2, and a hydroxyl value of 30 mg KOH/gm from Huntsman Polyurethanes;
34. Polyol B is polyethylene oxide capped polypropylene oxide polyether polyol having ethylene oxide content of about 27%, a functionality of 2, and a hydroxyl value of 30 mg KOH/gm from Huntsman Polyurethanes;
35. Polyol C is polyethylene oxide capped polypropylene oxide polyether polyol having ethylene oxide content of about 50%, a functionality of 2, and a hydroxyl value of 30 mg KOH/gm from Huntsman Polyurethanes;
36. Polyol D is a glycerol based polyethylene oxide capped polypropylene oxide polyether polyol having an ethylene oxide content of about 10%, a functionality of 3, and a hydroxyl value of 56 mg KOH/gm from Huntsman Polyurethanes;
37. Polyol E is a glycerol based polyethylene oxide capped polypropylene oxide polyether polyol having an ethylene oxide content of about 17%, a functionality of 3, and a hydroxyl value of 35 mg KOH/gm from Huntsman Polyurethanes;
38. Polyol F is a glycerol based polypropylene oxide polyether polyol having a functionality of 3 and a hydroxyl value of 28 mg KOH/gm from Huntsman Polyurethanes;
39. Polyol G from Huntsman Polyurethanes is an ethylene glycol/diethylene glycol initiated adipate polyester polyol having an average molecular weight (g/mol) of 2000, a functionality of 2.0, and a hydroxyl number of 55 mg KOH/gm.
40. Polyol H from Huntsman Polyurethanes is an ethylene glycol/butane diol initiated adipate polyester polyol having an average molecular weight (g/mol) of 2000, a functionality of 2.0, and a hydroxyl number of 55 mg KOH/gm.
41. Polyol X from Huntsman Polyurethanes has an average molecular weight (g/mole) of 260. Polyol X is a polyether diol that has a functionality of 3 and a hydroxyl number of 650 mg KOH/g. Polyol X is all PO tipped.
42. Polyol Y is a polyether polyol made by propoxylated glycerol and typically with 7% ethylene oxide. It has a hydroxyl value of 55 mg KOH/gm and is ethylene oxide tipped triol;

43. Polycat 46 is 38% potassium acetate in ethylene glycol(hydroxyl values 68.7), a strong trimer catalyst from Air Products and Chemicals, Allentown, Pa.;

44. PPG is polypropylene glycol;

45. PPG 200 is propylene glycol having a molecular weight of 200 from ARCO Chemical;

46. PPG 425 is propylene glycol having a molecular weight of 425 from ARCO Chemical;

47. PPG 1000 is propylene glycol having a molecular weight of 1000 from ARCO Chemical;

48. PPG 2000 is propylene glycol having a molecular weight of 2000 from ARCO Chemical;

49. Rucoflex S-2011-35 is a polyester polyol from Ruco Corporation, Hicksville, N.Y. having a molecular weight of 3000, a OH value of 35 and a functionality of 2.0

50. Rucoflex S-2011-35 is a polyester polyol from Ruco Corporation, Hicksville, N.Y. having a molecular weight of 2000, a OH value of 55 and a functionality of 2.0

51. Rucoflex S-2011-35 is a polyester polyol from Ruco Corporation, Hicksville, N.Y. having a molecular weight of 1000, a OH value of 110 and a functionality of 2.0

52. Stepanpol SP-1752 from Stepan Corporation, Northfield, Ill. 60093, is a diethylene glycol/orthophthalate polyester polyol having an average molecular weight (g/mol) of 640, a functionality of 2.0, and a hydroxyl value of 640 mg KOH/gm 53. TEG is triethylene glycol;

54. UAX 1075 is a blocked amine catalyst from OSI Specialties;

55. Unitol DSR from Unichem, Chicago, Ill. is a fatty acid derivative of oleic acid and linoleic acid.

56. Wurtz INT 6871 is an internal mold release agent for polyurethane foams from Wurtz, Bingen-Sponsheim, Germany;

57. Wurtz PAT 672 is an internal mold release agent for polyurethane rigid foams from Wurtz, Bingen-Sponsheim, Germany;

58. Molecular weight is number average.

Polyisocyanurate Systems

The isocyanates employed in the polyisocyanurate systems of the invention typically have viscosities of from about 50 to about 1500 centipoise("cps"), preferably about 50 to about 400 cps.

Isocyanate prepolymers may also be employed in the polyisocyanurate systems of the invention. Useful prepolymers which may be employed have a NCO value of from about 9 to about 26, preferably about 10 to about 26. Useful isocyanate prepolymers may be based on any of toluene diisocyanate, naphthalene diisocyante, hexamethylene diisocyante, MDI, hydrogenated MDI, and tetramethylxylene diisocyante.

The polyols employed in the polyisocyanurate systems of the invention typically have a viscosity of about 200 to about 8500 cps, preferably about 400 cps to about 1000 cps.

Useful polyols include polyether polyols and polyester polyols. Polyether polyols include those prepared by reacting alkylene oxides, aromatic-substituted alkylene oxides or mixtures thereof with an active hydrogen-containing initiator compound. Suitable oxides include ethylene oxide, propylene oxide, 1,2-butylene oxide, styrene oxide, epichlorohydrin, epibromohydrin, and mixtures thereof. Suitable initiator compounds include water, ethylene glycol, propylene glycol, butanediol, hexanediol, glycerine, trimethylol propane, pentaerythritol, hexanetriol, sorbitol, sucrose, hydroquinone, resorcinol, catechol, bisphenols, novolac resins, phosphoric acid and mixtures thereof. Other suitable initiators further include, for example, ammonia, ethylenediamine, diaminopropanes, diaminobutanes, diaminopentanes, diaminohexanes, diethylenetriamine, triethylenetetramine, tetraethylenepentamine, pentamethylenehexamine, ethanolamine, aminoethylethanolamine, aniline, 2,4-toluenediamine, 2,6-toluenediamine, 2,4'-diaminodiphenylmethane, 4,4'-diaminodiphenylmethane, 1,3-phenylenediamine, 1,4-phenylenediamine, naphthylene-1,5-diamine, triphenylmethane 4,4',4"-triamine, 4,4'-di(methylamino) diphenylmethane, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3', 5'-tetra-ethyl-4,4'-diamino-diphenylmethane, and amine aldehyde condensation products such as the polyphenylpolymethylene polyamines produced from aniline and formaldehyde and mixtures thereof.

Useful polyester polyols which may be employed include those prepared by reacting a polycarboxylic acid or anhydride with a polyhydric alcohol. The polycarboxylic acids may be aliphatic, cycloaliphatic, aromatic and/or heterocyclic and may be substituted (e.g., with halogen atoms) and/or unsaturated. Examples of suitable carboxylic acids and anhydrides include succinic acid; adipic acid; suberic acid; azelaic acid; sebacic acid; phthalic acid; isophthalic acid; terephthalic acid; trimellitic acid; phthalic acid anhydride; tetrahydrophthalic acid anhydride; hexahydrophthalic acid anhydride; tetrachlorophthalic acid anhydride; endomethylene tetrahydrophtalic acid anhydride; glutaric acid anhydride; maleic acid; maleic acid anhydride; fumaric acid; dimeric and trimeric fatty acids, such as those of oleic acid, which may be in admixture with monomeric fatty acids. Simple esters of polycarboxylic acids may also be used as starting materials for polyester polyols, such as terephthalic acid dimethyl ester, terephthalic acid bisglycol ester and mixtures thereof.

Useful weight ratios of isocyanate to polyol in the polyisocyanurate systems of the invention vary from about 0.3 to about 9.0, preferably about 0.6 to about 6.0, more preferably about 0.8 to about 1.2.

In order to cure the polyisocyanurate systems during pultrusion and to obtain good conversion to polyisocyanurate, a catalyst capable of initiating both a urethane and an isocyanurate reaction is included in the polyol component. Advantageously, catalysts in very small amounts of less than about one percent by weight based on the total weight of the polyol component may be used. Useful catalysts include tin salts such as stannous octoate and dibutyl tin dilaurate, tertiary amines such as diaminobicyclooctane, N,N dimethylcyclohexyl amine, N-methylmorphine, and N-methylimidazole, alkali carboxylates such as potassium 2-ethylhexanoate, potassium tetraalkylammonium carboxylates, sodium 2-ethylhexanoate, and sodium tetraalkylammonium carboxylate, and alkaline earth carboxylates such as strontium 2-ethylhexanoate and strontium tetraalkylammonium carboxylate. Alkali carboxylates are preferred.

Type I Polyisocyanurate Systems

Type I polyisocyanurate systems which include a polyol component having a chain extender and a catalyst, and an isocyanate component are formulated by blending. In Type I systems, the polyol may be present in an amount of up to about 1–99% and the chain extender may be present in an amount of up to about 1–99% based on total weight of the polyol component.

The polyols used in Type I polyisocyanurate systems typically have a molecular weight of about 300–6000, preferably about 1000 to about 6000 and a functionality of about 2 to about 4. More preferably, the polyols have a functionality of about 2 to about 3 and a molecular weight of about 2000 to 6000.

Polyols employed in Type I polyisocyanurate systems typically are polyethylene oxide capped polypropylene oxide polyether polyols having about 10 wt. % to about 50 wt. % ethylene oxide, a functionality of about 2, and a hydroxyl value of about 30 mg KOH/gm. These polyols are well known in the art and are commercially available. Examples of these polyols include Polyol A, Polyol B, Polyol C, Polyol D, Polyol E and Polyol F as defined above. Polyols such as Polyols A-F can be made by the addition of alkylene oxides such as ethylene and propylene oxide onto alcohols and amines which serve as initiators. Examples of these initiators include glycerol, DPG, and MEG.

Chain extenders which can be used in Type I polyisocyanurate systems include glycerols and diols which have at least 2 hydroxyl groups and a MW less than about 300. Useful chain extenders include glycerols and diols which have primary hydroxyl groups, glycerols and diols which have secondary hydroxyl groups and glycerols and diols which have both primary and secondary hydroxyl groups. Preferably, the chain extenders are glycerols and diols which have secondary hydroxyl groups and a molecular weight of more than about 62. Examples of these chain extenders include but are not limited to DEG, TEG, 2,3 BD, 1,2 PD, and DPG, preferably 1,2 PD and DPG.

Various additives may be included in the polyol component employed in Type I and Type II polyisocyanurate systems to control shrinking, color, mechanical properties, and fire retardance and release properties. Useful release agents include but are not limited to fatty amides such as erucamide or stearamide, fatty acids such as oleic acid, -amino oleic acid, fatty esters such as Loxiol G71S, carnuba wax, beeswax (natural esters), butyl stearate, octyl stearate, ethylene glycol monostearate, ethylene glycol distearate and glycerine monooleate, and esters of polycarboxylic acids with long chain aliphatic monovalent alcohols such as dioctal sebacate, mixtures of (a) mixed esters of aliphatic polyols, dicarboxylic acids and long-chained aliphatic monocarboxylic acids, and (b) esters of the groups: (1) esters of dicarboxylic acids and long-chained aliphatic monofunctional alcohols, (2) esters of long-chained aliphatic monofunctional alcohols and long-chained aliphatic monofunctional carboxylic acids, (3) complete or partial esters of aliphatic polyols and long-chained aliphatic monocarboxylic acids, in a ratio of (a) to (b) of from 1:3 to 9:1; silicones such as Tegostab L1–421T, Kemester 5721, metal carboxylates such as zinc stearate and calcium stearate, waxes such as montan wax and chlorinated waxes, fluorine containing compounds such as polytetrafluoroethylene, phosphates and chlorinated phosphates.

Useful additives for control of mechanical properties include calcium carbonate, barium sulfate, clay, aluminum trihydrate, antimony oxide, milled glass fibers, wollastonite, talc, mica, etc. These additives can be included in and added to the polyol component in amounts of up to about 65% based on the total weight of the polyol component.

In Type I polyisocyanurate systems, the isocyanate component may be any of 2,4' MDI, 4,4' MDI, polymeric MDI, blocked isocyanate, and ternary blends thereof. Examples of useful isocyanates include isocyanates A–D as defined above. Typically, ternary isocyanate blends such as isocyanate C and isocyanate D are prepared by mixing a standard polymeric MDI with a blend of 2,4' MDI and 4,4' MDI. Standard polymeric MDI is a mixture of functionality 2 and higher species such that the average functionality is about 2.5 to 2.8. See (G. Woods., The ICI Polyurethanes Book, sec. ed. John Wiley, N.Y. 1990, page 34–35).

In Type I polyisocyanurate systems, the polyol, chain extender and isocyanate may be varied to control the miscibility of the reaction mixture formed. Generally, for an isocyanate having a given 2,4'-MDI content, the miscibility of the polyol component-isocyanate reaction mixture may be increased by using polyols which have higher amounts of ethylene oxide ("EO")content. Polyols with higher ethylene oxide contents up to about 50% ethylene oxide content are preferred. Chain extenders which have higher levels of secondary hydroxyls also may be used to increase the miscibility of the reaction mixture. Chain extenders which have secondary hydroxyls and a molecular weight greater than 62 are preferred. Isocyanates with higher amounts of 2,4'-MDI are preferred to achieve increased miscibility.

Type II Polyisocyanurate Systems

In Type II polyisocyanurate systems, the isocyanate component may be any of 2,4' MDI, 4,4' MDI, polymeric MDI, and blends thereof. Examples of useful isocyanates include isocyanates A–D as defined above. Typically, ternary isocyanate blends such as isocyanate C and isocyanate D are prepared by mixing a standard polymeric MDI with a blend of 2,4' MDI and 4,4' MDI.

Type II polyisocyanurate systems employ polyether polyols which have an EO content less than about 15 wt. % and a molecular weight of about 300–2000, preferably about 300-1000. The functionality of the low EO polyether polyols employed is about 2 to about 6, preferably about 2 to about 3, most preferably about 2. Examples of useful low EO polyether polyols include PPG 425, Polyol F, PPG 1000, PPG 2000 and Polyol D. Blends of low EO polyether polyols also can be used as the polyol component. In this aspect, the MW of the individual polyether polyols is about 175 to about 1000.

Pultrusion of Type I and Type II Polyisocyanurate Systems

Type I and Type II polyisocyanurate systems, preferably Type I systems, may be used to produce pultruded neat polyisocyanurates as well as pultruded polyisocyanurate composites.

Polyisocyanurate systems of the invention having indices of from about 200 to about 1000, preferably about 300 to about 600 may be pultruded. Polyisocyanurate systems which include fire retardant additives may be pultruded at indices of about 300 to about 900.

The reaction mixtures formed from the polyisocyanurate systems employed in the invention have numerous advantages for use in pultrusion. These advantages include long pot life at ambient temperatures, ability to be easily mixed, viscosities suitable for good wet-out of the reinforcement material under resin injection conditions, good bonding with the reinforcement material even when unsized, and snap-cure characteristics when heated to a specific temperature. For example, Type I and Type II polyisocyanurate systems at an index of from about 300 to about 900 are fully cured at about 120–140° C. in about 1 minute with an isocyanate conversion of about 95%. The polyisocyanurate systems employed in the invention can be pultruded in the presence of glass fiber reinforcement to produce glass fiber reinforced, polyisocyanurate composites and cured in-situ at elevated temperatures.

Miscibility Evaluation

In order to evaluate the miscibility of the polyisocyanurate systems employed in the invention, one gram of isocyanate is placed on a watch glass. Then, the polyol component is added to achieve an index of 650. The polyol component and the isocyanate are mixed by hand with a spatula for 30 seconds. The resulting reaction mixture is evaluated for clarity. If the reaction mixture is clear within 30 seconds after mixing is stopped, then the polyisocyanurate system is considered miscible.

The invention will now be further illustrated by reference to the following non-limiting examples.

Type I Immiscible Polyisocyanurate Systems

EXAMPLE 1

The following components are blended where all amounts are in parts by weight.

| Polyol Component | Amount |
| --- | --- |
| Polyol A | 100 |
| MEG | 6.76 |
| Isocyanate B | |
| Index 650 | |

After mixing is finished, it took 500 seconds before the mixture became transparent. The system is therefore immiscible.

Type I Miscible Polyisocyanurate Systems

EXAMPLE 2

The procedure of example 1 is repeated except that DPG is substituted for MEG as a chain extender. The amount of DPG is such that the molar amount of chain extender is equal to that used in example 1. Also, Isocyanate D is substituted for isocyanate B. All amounts of materials in the polyol component are parts by weight.

| Polyol Component | Amount |
| --- | --- |
| Polyol A | 100 |
| DPG | 16.3 |
| Isocyanate D | |
| Isocyanate index = 650 | |

The mixture is optically transparent within thirty seconds after mixing is stopped, indicating good system miscibility.

EXAMPLE 2A

The procedure of example 2 is repeated except with the following amounts of the components, where all amounts of the materials in the polyol component are expressed in wt % based on total weight of the polyol component. The amount of the Dabco T45 catalyst is based on the total weight of the polyol component.

| Polyol Component | Amount |
| --- | --- |
| Polyol A | 86.40 |
| TEG | 13.60 |
| Total | 100.00 |
| Dabco T45 Catalyst 0.13% | |
| Isocyanate: Isocyanate D | |
| Index: 650 | |
| The reaction mixture is miscible. | |

EXAMPLE 2B

The following components are blended where all amounts are in weight % based on the total weight of the polyol component. The isocyanate and polyol component components are uniformly mixed at room temperature in a static mixer.

| Polyol Component | Amount |
| --- | --- |
| Polyol A | 87.5 |
| DPG | 12.5 |
| Total | 100.00 |
| Dabco T-45: 0.294% based on total weight of the polyol component | |
| Isocyanate: Isocyanate D | |
| Index: 650 | |
| The reaction mixture is miscible. | |

EXAMPLE 2C

The procedure of example 2B is repeated except with the following amounts of the components, where all amounts of materials in the polyol component are expressed in wt. % based on total weight of the polyol component. The amount of the catalyst is based on the total weight of the polyol component.

| Polyol Component | Amount |
| --- | --- |
| Polyol A | 90.30 |
| 2, 3 BD | 9.70 |
| Total | 100.00 |
| Dabco T45 Catalyst: 0.28% based on total weight of the polyol component | |
| Isocyanate: Isocyanate D | |
| Index: 650 | |
| The reaction mixture is miscible. | |

EXAMPLE 2D

The procedure of example 2B is repeated except with the following amounts of the components, where all amounts of materials in the polyol component are expressed in wt. % based on total weight of the polyol component. The amount of the catalyst is based on the total weight of the polyol component.

| Polyol Component | Amount |
|---|---|
| Polyol A | 92.50 |
| 1, 2 PD | 7.50 |
| Total | 100.00 |

Dabco T45 Catalyst: 0.28% based on total weight of the polyol component
Isocyanate: Isocyanate D
Index: 650
The reaction mixture is miscible.

EXAMPLE 2E

The procedure of example 2B is repeated except with the following amounts of the components, where all amounts of the materials in the polyol component are expressed in wt. % based on total weight of the polyol component. The amount of the catalyst is based on the total weight of the polyol component.

| Polyol Component | Amount |
|---|---|
| Polyol A | 91.20 |
| 2 m 1, 3 PD | 8.80 |
| Total | 100.00 |

Dabco T45 Catalyst: 0.11% based on total weight of the polyol component
Isocyanate: Isocyanate D
Index: 650
The reaction mixture is miscible.

Type II Miscible Polyisocyanurate Systems

EXAMPLE 2F

The following components are blended to provide a reaction mixture.
Polyol: PPG425
Isocyanate D
Isocyanate index=450

The mixture is optically transparent within 30 seconds after mixing is stopped indicating good system miscibility.

Evaluation of Cure Characteristics

To evaluate cure characteristics of the polyisocyanurate systems, the polyol component and isocyanate components of the polyisocyanurate systems are mixed manually in a paper cup for about 20 seconds and then poured into a glass vial. The glass vial accommodates approximately 5 g of the sample. A mark is placed on the vial so as to repeat the amount of polyisocyanurate system added to the vial to an accurate extent.

The glass vial is placed in a heated oil bath to ensure consistent temperature. The components themselves are not heated and are at room temperature when placed into the glass vial. A vibrating needle (Polymer labs UK) is placed into the glass vial to estimate the viscosity of the mixture. As the reaction proceeds, the viscosity of the mixture increases and is recorded by the vibrating needle connected to a pen recorder. The time when the viscosity increases steeply is taken as the gel time. The gel time is given in seconds.

This test procedure is repeated for different polyisocyanurate systems having differing catalyst levels, different oil bath temperatures, and different isocyanate indices.

Gel Times of Type I Immiscible Polyisocyanurate Systems

EXAMPLES 3A–3L

In each of Examples 3A–3L, the gel time of the immiscible system of Example 1 is measured as a function of catalyst concentration and oil bath temperature. As a catalyst, a mixture of Dabco T45, Dabco T12 and Dabco TMR at a weight ratio of 35.0 to 3.5 to 61.5 is used. As in example 1, the isocyanate index is 650. The results are shown below in Table 1.

TABLE 1

| Example | Bath Temp ° C. | Catalyst amount Wt % | Gel Time (sec) |
|---|---|---|---|
| 3A | 23 | 0.125 | approx. 600 |
| 3B | 55 | 0.125 | 90 |
| 3C | 85 | 0.125 | 60 |
| 3D | 124 | 0.125 | 30 |
| 3E | 23 | 0.25 | 84 |
| 3F | 55 | 0.25 | 55 |
| 3G | 85 | 0.25 | 50 |
| 3H | 124 | 0.25 | 24 |
| 3I | 23 | 0.50 | 36 |
| 3J | 55 | 0.50 | 28 |
| 3K | 85 | 0.50 | 24 |
| 3L | 124 | 0.50 | 20 |

Gel Times of Type I Miscible Polyisocyanurate Systems

EXAMPLES 4A–4P and 4AA–4LL

The miscible system of Example 2 is modified to include Dabco T45 catalyst. In each of these examples, the gel time of is measured as a function of the catalyst concentration and oil bath temperature. This is done at isocyanate indices 650 and 450. The gel times are shown in Tables 2 and 2A.

TABLE 2

Gel times at Isocyanate index 650

| Example | Oil Bath Temp ° C. | Dabco T45 Wt % | Gel Time (sec) |
|---|---|---|---|
| 4A | 23 | 0.1 | approx. 600 |
| 4B | 50 | 0.1 | 145 |
| 4C | 80 | 0.1 | 58 |
| 4D | 120 | 0.1 | 35 |
| 4E | 150 | 0.1 | 20 |
| 4F | 23 | 0.125 | 145 |
| 4G | 50 | 0.125 | 50 |
| 4H | 80 | 0.125 | 45 |
| 4I | 120 | 0.125 | 30 |
| 4J | 150 | 0.125 | <15 |
| 4K | 23 | 0.25 | 30 |
| 4L | 50 | 0.25 | 25 |
| 4M | 80 | 0.25 | 25 |
| 4N | 120 | 0.25 | 20 |
| 4P | 150 | 0.25 | <15 |

TABLE 2A

Gel times at Isocyanate Index 450

| Example | Oil Bath Temp ° C. | Catalyst amount Wt % | Gel Time (sec) |
|---|---|---|---|
| 4AA | 23 | 0.15 | approx. 600 |
| 4BB | 55 | 0.15 | 180 |
| 4CC | 80 | 0.15 | 80 |
| 4DD | 120 | 0.15 | 40 |
| 4EE | 23 | 0.2 | 420 |
| 4FF | 55 | 0.2 | 110 |
| 4GG | 80 | 0.2 | 60 |
| 4HH | 120 | 0.2 | 40 |
| 4II | 23 | 0.25 | 200 |
| 4JJ | 55 | 0.25 | 80 |

TABLE 2A-continued

Gel times at Isocyanate Index 450

| Example | Oil Bath Temp ° C. | Catalyst amount Wt % | Gel Time (sec) |
|---|---|---|---|
| 4KK | 80 | 0.25 | 45 |
| 4LL | 120 | 0.25 | 30 |

Gel Times of Type II Miscible Polyisocyanurate systems

EXAMPLES 5A–5E

In each of examples 5A–5E, the gel time of the system described in Example 2F is measured as a function of oil bath temperature. The isocyanate index is 450. Dabco T45 catalyst in an amount of of 0.1 weight % based on the total weight of the polyol component as added to the polyol component. The results are shown in Table 3.

TABLE 3

| Example | Bath Temp ° C. | Gel Time (sec) |
|---|---|---|
| 5A | 25 | >500 |
| 5B | 50 | 130 |
| 5C | 80 | 50 |
| 5D | 120 | 40 |
| 5E | 150 | 20 |

Effect of EO content of Polyol on Miscibility of Type I Polyisocyanurate systems

EXAMPLES 6A–6AA

In each of examples 6A–6AA, the effect of EO content of the polyol on the miscibility of Example 2 is illustrated in Table 4.

TABLE 4

Effect of EO Content of Polyol

| EX | Polyol | % EO in Polyol | Chain Extender | Amount of Chain Extender[1] | Isocyanate | Index | Result[2] |
|---|---|---|---|---|---|---|---|
| 6A | Polyol C | 50.0 | MEG | 5.63 | Isocyanate B | 650 | I |
| 6B | Polyol C | 50.0 | DEG | 9.62 | Isocyanate B | 650 | M |
| 6C | Polyol C | 50.0 | TEG | 13.6 | Isocyanate B | 650 | M |
| 6D | Polyol C | 50.0 | 1,4BD | 8.16 | Isocyanate B | 650 | I |
| 6E | Polyol C | 50.0 | 1,3BD | 8.16 | Isocyanate B | 650 | I |
| 6F | Polyol C | 50.0 | 2,3BD | 8.16 | Isocyanate B | 650 | M |
| 6G | Polyol C | 50.0 | 1,2PD | 8.16 | Isocyanate B | 650 | M |
| 6H | Polyol C | 50.0 | DPG | 12.23 | Isocyanate B | 650 | M |
| 6I | Polyol C | 50.0 | 2m1,3PD | 8.16 | Isocyanate B | 650 | I |
| 6J | Polyol B | 27.0 | MEG | 5.63 | Isocyanate B | 650 | I |
| 6K | Polyol B | 27.0 | DEG | 9.62 | Isocyanate B | 650 | I |
| 6L | Polyol B | 27.0 | TEG | 13.6 | Isocyanate B | 650 | I |
| 6M | Polyol B | 27.0 | 1,4BD | 8.16 | Isocyanate B | 650 | I |
| 6N | Polyol B | 27.0 | 1,3BD | 8.16 | Isocyanate B | 650 | I |
| 6O | Polyol B | 27.0 | 2,3BD | 8.16 | Isocyanate B | 650 | I |
| 6P | Polyol B | 27.0 | 1,2PD | 8.16 | Isocyanate B | 650 | I |
| 6Q | Polyol B | 27.0 | DPG | 12.23 | Isocyanate B | 650 | I |
| 6R | Polyol B | 27.0 | 2m1,3PD | 8.16 | Isocyanate B | 650 | I |
| 6S | Polyol A | 21.0 | MEG | 5.63 | Isocyanate B | 650 | I |
| 6T | Polyol A | 21.0 | DEG | 9.62 | Isocyanate B | 650 | I |
| 6U | Polyol A | 21.0 | TEG | 13.60 | Isocyanate B | 650 | I |
| 6V | Polyol A | 21.0 | 1,4BD | 8.16 | Isocyanate B | 650 | I |
| 6W | Polyol A | 21.0 | 1,3BD | 8.16 | Isocyanate B | 650 | I |
| 6X | Polyol A | 21.0 | 2,3BD | 8.16 | Isocyanate B | 650 | I |
| 6Y | Polyol A | 21.0 | 1,2PD | 8.16 | Isocyanate B | 650 | I |
| 6Z | Polyol A | 21.0 | DPG | 12.23 | Isocyanate B | 650 | I |
| 6AA | Polyol A | 21.0 | 2m1,3PD | 8.16 | Isocyanate B | 650 | I |

[1] Per 100 gm of polyol
[2] I = Immiscible, M = Miscible

Effect of 2,4 MDI Content of Isocyanate on Miscibility of Type I Polyisocyanurate Systems

EXAMPLES 7A–7AG

Examples 7A–7AG in Table 5 show the effect of 2,4' MDI content on miscibility of Type I polyisocyanurate systems. In each of the formulations shown in Table 5, the Index is 650.

TABLE 5

Effect of Isocyanate Composition on Miscibility of Type I Polyisocyanurate Systems

| EX | Isocyanate | % 2,4'MDI in Isocyanate | Chain Extender | Amount of Chain Extender[1] | Polyol | Result[2] |
|---|---|---|---|---|---|---|
| 7A | Isocyanate B | 0 | MEG | 6.76 | Polyol A | I |
| 7B | Isocyanate B | 0 | DEG | 11.32 | Polyol A | I |
| 7C | Isocyanate B | 0 | TEG | 16.01 | Polyol A | I |
| 7D | Isocyanate B | 0 | 1,4BD | 9.61 | Polyol A | I |
| 7E | Isocyanate B | 0 | 1,3BD | 9.61 | Polyol A | I |
| 7F | Isocyanate B | 0 | 2,3BD | 9.61 | Polyol A | I |
| 7G | Isocyanate B | 0 | 1,2PD | 8.11 | Polyol A | I |
| 7H | Isocyanate B | 0 | DPG | 14.39 | Polyol A | I |
| 7I | Isocyanate C | 9.4 | 2m1,3PD | 9.61 | Polyol A | I |
| 7J | Isocyanate C | 9.4 | MEG | 6.76 | Polyol A | I |
| 7K | Isocyanate C | 9.4 | DEG | 11.32 | Polyol A | M |
| 7L | Isocyanate C | 9.4 | TEG | 16.01 | Polyol A | M |
| 7M | Isocyanate C | 9.4 | 1,4BD | 9.61 | Polyol A | I |
| 7N | Isocyanate C | 9.4 | 1,3BD | 9.61 | Polyol A | M |
| 7O | Isocyanate C | 9.4 | 2,3BD | 9.61 | Polyol A | M |
| 7P | Isocyanate C | 9.4 | 1,2PD | 8.11 | Polyol A | I |
| 7Q | Isocyanate C | 9.4 | DPG | 14.39 | Polyol A | M |
| 7R | Isocyanate C | 9.4 | 2m1,3PD | 9.61 | Polyol A | I |
| 7S | Isocyanate D | 19.5 | MEG | 5.63 | Polyol A | I |

TABLE 5-continued

Effect of Isocyanate Composition on Miscibility of Type I Polyisocyanurate Systems

| EX | Isocyanate | % 2,4'MDI in Isocyanate | Chain Extender | Amount of Chain Extender[1] | Polyol | Result[2] |
|---|---|---|---|---|---|---|
| 7T | Isocyanate D | 19.5 | DEG | 9.62 | Polyol A | M |
| 7U | Isocyanate D | 19.5 | TEG | 13.60 | Polyol A | M |
| 7V | Isocyanate D | 19.5 | 1,4BD | 8.16 | Polyol A | I |
| 7AA | Isocyanate D | 19.5 | 1,3BD | 8.16 | Polyol A | M |
| 7BB | Isocyanate D | 19.5 | 2,3BD | 8.16 | Polyol A | M |
| 7CC | Isocyanate D | 19.5 | 1,2PD | 8.16 | Polyol A | M |
| 7DD | Isocyanate D | 19.5 | DPG | 12.23 | Polyol A | M |
| 7EE | Isocyanate D | 19.5 | 2m1,3PD | 8.16 | Polyol A | M |
| 7FF | Isocyanate B | 0 | MEG | 6.76 | Polyol B | I |
| 7GG | Isocyanate B | 0 | DEG | 11.32 | Polyol B | I |
| 7HH | Isocyanate B | 0 | TEG | 16.01 | Polyol B | I |
| 7II | Isocyanate B | 0 | 1,4BD | 9.61 | Polyol B | I |
| 7JJ | Isocyanate B | 0 | 1,3BD | 9.61 | Polyol B | I |
| 7KK | Isocyanate B | 0 | 2,3BD | 9.61 | Polyol B | I |
| 7LL | Isocyanate B | 0 | 1,2PD | 8.11 | Polyol B | I |
| 7MM | Isocyanate B | 0 | DPG | 14.39 | Polyol B | I |
| 7NN | Isocyanate C | 9.4 | 2m1,3PD | 9.61 | Polyol B | I |
| 7OO | Isocyanate C | 9.4 | MEG | 6.76 | Polyol B | I |
| 7PP | Isocyanate C | 9.4 | DEG | 11.32 | Polyol B | M |
| 7QQ | Isocyanate C | 9.4 | TEG | 16.01 | Polyol B | M |
| 7RR | Isocyanate C | 9.4 | 1,4BD | 9.61 | Polyol B | I |
| 7SS | Isocyanate C | 9.4 | 1,3BD | 9.61 | Polyol B | I |
| 7TT | Isocyanate C | 9.4 | 2,3BD | 9.61 | Polyol B | I |
| 7UU | Isocyanate C | 9.4 | 1,2PD | 8.11 | Polyol B | I |
| 7VV | Isocyanate C | 9.4 | DPG | 14.39 | Polyol B | M |
| 7WW | Isocyanate C | 9.4 | 2m1,3PD | 9.61 | Polyol B | I |
| 7XX | Isocyanate D | 19.5 | MEG | 5.63 | Polyol B | I |
| 7YY | Isocyanate D | 19.5 | DEG | 9.62 | Polyol B | M |
| 7ZZ | Isocyanate D | 19.5 | TEG | 13.60 | Polyol B | M |
| 7AB | Isocyanate D | 19.5 | 1,4BD | 8.16 | Polyol B | M |
| 7AC | Isocyanate D | 19.5 | 1,3BD | 8.16 | Polyol B | M |
| 7AD | Isocyanate D | 19.5 | 2,3BD | 8.16 | Polyol B | M |
| 7AE | Isocyanate D | 19.5 | 1,2PD | 8.16 | Polyol B | M |
| 7AF | Isocyanate D | 19.5 | DPG | 12.23 | Polyol B | M |
| 7AG | Isocyanate D | 19.5 | 2m1,3PD | 8.16 | Polyol B | M |

[1]Per 100 gm of polyol
[2]I = Immiscible, M = Miscible

Effect of PO Content of Polyol on Miscible of Type II Polyisocyanurate Systems

EXAMPLE 8A–8A41

Examples 8A–8A41 show the effect of polyol on the miscibility of Type II polyisocyanurate systems. Miscibility is evaluated using the miscibility test disclosed above. The results are shown in Table 6.

TABLE 6

Effect of Polyol on Miscibility of Type II Polyisocyanurates Systems

| Example | Polyol | FN | % PO Content | OHV | Wt. Of Polyol/gm Isocyanate D | Result[1] |
|---|---|---|---|---|---|---|
| 8A | DPG | 2 | 100 | 830 | 0.1 | I |
| 8B | PPG 200 | 2 | 100 | 561 | 0.1 | I |
| 8C | PPG 425 | 2 | 100 | 250 | 0.1 | M |
| 8D | PPG 1000 | 2 | 100 | 107 | 0.1 | M |
| 8E | PPG 2000 | 2 | 100 | 56.1 | 0.1 | M |
| 8F | Polyol D | 3 | 90 | 56 | 0.1 | M |
| 8G | Polyol F | 3 | 100 | 28 | 0.1 | M |
| 8H | Polyol E | 3 | 83 | 35 | 0.1 | M |
| 8J | Polyol A | 2 | 79 | 30 | 0.1 | M |
| 8K | Polyol C | 3 | 50 | 48 | 0.1 | M |
| 8L | DPG | 2 | 100 | 830 | 0.5 | I |
| 8M | PPG 200 | 2 | 100 | 561 | 0.5 | I |
| 8N | PPG 425 | 2 | 100 | 250 | 0.5 | M |
| 8O | PPG 1000 | 2 | 100 | 107 | 0.5 | M |
| 8P | PPG 2000 | 2 | 100 | 56.1 | 0.5 | M |
| 8Q | Polyol D | 3 | 90 | 56 | 0.5 | M |
| 8R | Polyol F | 3 | 100 | 28 | 0.5 | I |
| 8S | Polyol E | 3 | 83 | 35 | 0.5 | M |
| 8T | Polyol A | 2 | 79 | 30 | 0.5 | M |
| 8U | Polyol C | 3 | 50 | 48 | 0.5 | M |
| 8V | DPG | 2 | 100 | 830 | 0.7 | I |
| 8W | PPG 200 | 2 | 100 | 561 | 0.7 | I |
| 8X | PPG 425 | 2 | 100 | 250 | 0.7 | M |
| 8Y | PPG 1000 | 2 | 100 | 107 | 0.7 | M |
| 8Z | PPG 2000 | 2 | 100 | 56.1 | 0.7 | M |
| 8A1 | Polyol D | 3 | 90 | 56 | 0.7 | M |
| 8A2 | Polyol F | 3 | 100 | 28 | 0.7 | M |
| 8A3 | Polyol E | 3 | 83 | 35 | 0.7 | M |
| 8A4 | Polyol A | 2 | 79 | 30 | 0.7 | M |
| 8A5 | DPG | 2 | 100 | 830 | 1 | I |
| 8A6 | PPG 200 | 2 | 100 | 561 | 1 | I |
| 8A7 | PPG 425 | 2 | 100 | 250 | 1 | M |
| 8A8 | PPG 1000 | 2 | 100 | 107 | 1 | M |
| 8A9 | PPG 2000 | 2 | 100 | 56.1 | 1 | I |
| 8A10 | Polyol D | 3 | 90 | 56 | 1 | I |
| 8A11 | Polyol F | 3 | 100 | 28 | 1 | I |
| 8A12 | Polyol E | 3 | 83 | 35 | 1 | I |
| 8A13 | Polyol A | 2 | 79 | 30 | 1 | M |
| 8A14 | Polyol C | 3 | 50 | 48 | 1 | M |
| 8A15 | DPG | 2 | 100 | 830 | 0.1 | I |
| 8A16 | PPG 200 | 2 | 100 | 561 | 0.1 | I |
| 8A17 | PPG 425 | 2 | 100 | 250 | 0.1 | M |
| 8A18 | PPG 1000 | 2 | 100 | 107 | 0.1 | M |
| 8A19 | PPG 2000 | 2 | 100 | 56.1 | 0.1 | M |
| 8A20 | Polyol D | 3 | 90 | 56 | 0.1 | M |
| 8A21 | Polyol F | 3 | 100 | 28 | 0.1 | M |
| 8A22 | Polyol E | 3 | 83 | 35 | 0.1 | M |
| 8A23 | Polyol A | 2 | 79 | 30 | 0.1 | M |
| 8A24 | DPG | 2 | 100 | 830 | 0.5 | I |
| 8A25 | PPG 200 | 2 | 100 | 561 | 0.5 | I |
| 8A26 | PPG 425 | 2 | 100 | 250 | 0.5 | M |
| 8A27 | PPG 1000 | 2 | 100 | 107 | 0.5 | M |
| 8A28 | PPG 2000 | 2 | 100 | 56.1 | 0.5 | M |
| 8A29 | Polyol D | 3 | 90 | 56 | 0.5 | I |
| 8A30 | Polyol F | 3 | 100 | 28 | 0.5 | I |
| 8A31 | Polyol E | 3 | 83 | 35 | 0.5 | I |
| 8A32 | Polyol A | 2 | 79 | 30 | 0.5 | I |
| 8A33 | Polyol C | 3 | 50 | 48 | 0.5 | M |
| 8A34 | DPG | 2 | 100 | 830 | 1 | I |
| 8A35 | PPG 200 | 2 | 100 | 561 | 1 | I |
| 8A36 | PPG 425 | 2 | 100 | 250 | 1 | M |
| 8A37 | PPG 1000 | 2 | 100 | 107 | 1 | I |
| 8A38 | PPG 2000 | 2 | 100 | 56.1 | 1 | I |
| 8A39 | Polyol D | 3 | 90 | 56 | 1 | I |
| 8A40 | Polyol F | 3 | 100 | 28 | 1 | I |
| 8A41 | Polyol E | 3 | 83 | 35 | 1 | I |

[1]I = Immiscible; M = Miscible

EXAMPLES A–D

Examples A–D illustrate the use of polyester polyols in polyisocyanurate systems which may be used in manufacture of pultruded polyisocyanurates and reinforced pultruded polyisocyanurate matrix composites.

EXAMPLE A

The following components are blended where all amounts are in parts by weight.

| Polyol Component | Parts by weight |
|---|---|
| Polyol G | 100.0 |
| Dabco T-45 | 0.4 |
| DEG | 12.0 |
| Total | 112.4 |
| Isocyanate A 155.0 parts, 400 Index | |

EXAMPLE B

The following components are blended where all amounts are in parts by weight.

| Polyol Component | Parts by weight |
|---|---|
| Rucoflex S-2011-35 | 100.0 |
| Dabco T-45 | 0.4 |
| MEG | 12.0 |
| | 112.4 |
| Isocyanate B 229.7 parts, 400 Index | |

EXAMPLE C

The following components are blended where all amounts are in parts by weight.

| Polyol Component | Parts by weight |
|---|---|
| Rucoflex S-2011-55 | 100.0 |
| Dabco T-45 | 0.4 |
| DPG | 6.0 |
| | 106.4 |
| Isocyanate B 156.2 parts, 400 Index | |

EXAMPLE D

The following components are blended where all amounts are in parts by weight.

| Polyol Component | Parts by weight |
|---|---|
| Stepanpol SP-1752 | 100.0 |
| Dabco T-45 | 0.4 |
| DPG | 4.0 |
| | 104.4 |
| Isocyanate B 204.5 parts, 400 Index | |

Mechanical Properties of Neat Polyisocyanurates

Dried and degassed isocyanates and polyol components are employed to produce neat polyisocyanurate castings. The polyol component is rotovaped at 16 mbar and 80° C. for 2 hours. The isocyanate is placed under full vacuum for 1 hour while stirring. Neat polyisocyanurate castings are produced by mixing the dried and degassed isocyanate and polyol components in a paper cup with a spatula. A thin layer of the resulting reaction mixture is poured into a Teflon based mold. This layer is placed under vacuum in a desiccator for 3 minutes and then cured in a preheated oven at 150° C. to yield a casting. Samples are cut from the casting to determine the flexural modulus (ASTM 790) and impact strength (unnotched charpy). The neat polyisocyanurate castings have flexural strengths comparable to polyester, and have much greater flexibility than polyester.

Type I Polyisocyanurates

EXAMPLE 9

The composition of example 2 is modified to include 0.3 weight % Dabco T-45 catalyst based on total weight of the polyol component. Castings from the formulation are produced as above at an isocyanate indices of 300 and 500. The results are:

| | Index 300 | Index 500 |
|---|---|---|
| Flexural Modulus (MPa) | 690 | 1100 |
| Impact Strength (kJ/m$^2$) | 54 | 24 |

Type II Polyisocyanurates

EXAMPLE 10

The composition of example 2F is modified to include 0.3 weight % Dabco T-45 catalyst based on total weight of the polyol component. A casting is produced at an isocyanate index of 500. The flexural modulus is 2700 MPa and the impact strength is 28 kJ/m$^2$.

Pultrusion of Polyisocyanurate Systems

Generally, pultrusion of neat polyisocyanurates and glass fiber reinforced polyisocyanurate composites, as well as neat polyurethanes and glass fiber reinforced polyurethane composites is performed by supplying the isocyanate and polyol components to a mix metering machine for delivery in a desired ratio to a static mixer to produce a reaction mixture. Fibers useful as reinforcements include glass fibers, aramid fibers such as nylon, Kevlar, carbonaceous fibers such as graphite fibers, metal fibers such as steel fibers, and natural fibers such as lignocellulosic fibers, hemp, and jute, preferably glass fibers.

During pultrusion, the polyol component and isocyanate used in the polyisocyanurate systems of the invention are statically mixed to yield a reaction mixture suitable for use in pultrusion. Dynamic mixing may be used provided that it does not generate heat in the resulting reaction mixture or entrain gas in the reaction mixture. Preferably, static mixing is used. When static mixing is employed, the static mixer is cooled, preferably to about 10° C. to 30° C., more preferably about 15° C. At about 10–30° C., the polyisocyanurate system reaction mixture thoroughly wets the glass fiber reinforcement but does not convert to polyisocyanurate. At temperatures of about 10–30° C., the initiation time of polyisocyanurate reaction of the polyisocyanurate reaction mixture is extended to at least 15 minutes.

The reaction mixture is supplied to an injection die where it can be used to impregnate glass fibers being fed concurrently into the injection die to produce a composite of fibers coated with the polyisocyanurate reaction mixture. The reaction mixture and fibers are present in the injection die for very short time periods, typically less than about 50 seconds. The resulting composite is sent to a zoned curing die having a desired cross-section of a pultrusion machine where it is at least partially cured and shaped. The gel time of the polyisocyanurate reaction mixture that optionally includes catalysts and internal mold release agents is sufficient to insure that the reaction mixture at least partially cures in the curing die.

Curing of the polyisocyanurate systems employed in the invention entails a two step procedure wherein the polyisocyanurate system reaction mixture is maintained at about 10° C. to about 30° C. to produce polyurethanes and then heated to about 150° C. to produce snap-cured polyisocyanurates. During pultrusion, the fibers are pulled at a speed sufficient to ensure that the fibers are wetted by the reaction mixture supplied to the injection die. Similarly, the viscosity of the reaction mixture and the pressure at which the reaction mixture is supplied to the injection die are sufficient to ensure that the fibers are wetted. Typically, the reaction mixture is supplied at a pressure of about one to ten atmospheres. During pultrusion, the temperature of the injection die temperature is sufficiently cool to maintain the polyisocyanurate reaction mixture in a liquid state and below the isocyanate reaction temperature.

During pultrusion, the systems employed in the invention can undergo substantial polymerization while in the injection die. In this context, substantial polymerization is understood to mean that at least 50% of the OH groups of the polyol component of the reaction mixture are utilized while the reaction mixture is in the injection die.

The pultruded composites produced by the invention have about 10–90%, preferably about 20–80%, more preferably about 30–75% of fibers based on the total weight of the composite.

In pultrusion of the polyisocyanurate systems employed in the invention, the isocyanate and polyol components are supplied to a Cannon 2-component RIM machine or a Liquid Control machine for metering of these components to a static mixer. The throughput of these machines is about 4.5 gm/sec to about 40 gm/sec. The static mixers employed are equipped with 22 polypropylene elements or 24 nylon elements. The mixers combine the isocyanate and polyol components to provide a reaction mixture for supply to the injection die of a pultrusion machine. The static mixers vary from 9.0–9.4 mm diameter and from 185–190 mm long.

The pultrusion machines employed are either a Pulstar 2408 machine from Owens-Coming Fiberglass Co., Grainville, Ohio or a Pultrex P8000 machine from Pultrex, Ltd., England. These machines employ a reciprocating type puller. These machines are also equipped with a closed injection die and a zoned curing die that is in direct contact with the injection die. The injection die is 220 mm long. The closed injection die preferably is that shown in U.S. Pat. No. 5,783,013, the teachings of which are incorporated by reference herein in their entirety. The closed injection die is capable of concurrent receipt of fiber reinforcement and the polyolisocyanate reaction mixture. The curing die measures 1050 mm×180 mm×80 mm whereas the cavity formed by the curing die measures 1050 mm×100 mm×3 mm. That portion of the curing die that contacts the injection die is equipped with cooling coils to maintain the polyisocyanurate system reaction mixture at about 4–10° C.

The zoned curing die is equipped with electrical heating coils. Each of the coils is attached to a separate controller so that the front, middle and end portions of the curing die are maintained at desired temperatures.

During pultrusion of the polyisocyanurate systems employed in the invention, the reaction mixture is supplied from the static mixer at about 1–10 atm. to the injection die while glass fiber reinforcement is supplied to the die at a rate of about 0.3–1.6 m/min. The glass fiber reinforcement is supplied to the injection die in the form of glass rovings and mats to achieve about a 50–55 weight % of glass reinforcement in the pultruded polyisocyanurate composite. Typically, the glass fiber reinforcement is supplied in the form of six rovings on top, 48 rovings in the middle, and 6 rovings on the bottom. A glass fiber mat is present between the top roving and middle roving. A glass fiber mat also is present between the middle roving and the bottom roving. Typical pull speeds during pultrusion are about 0.3–1.6 meter per minute and typical pull forces are about 1–20 kilo newton.

The flexural strength of the pultruded glass fiber reinforced polyisocyanurate composite can be controlled by varying the weight percent of isocyanate in the polyisocyanurate formulation. Generally, the flexural strength of the pultruded polyisocyanurate composites produced with TYPE I and TYPE II systems is increased by decreasing the amount of isocyanate in the formulation.

Pultrusion of TYPE I Polyisocyanurate Systems

EXAMPLE 11

This example illustrates pultrusion of glass fiber reinforced Type I immiscible polyisocyanurate system. The isocyanate and polyol components are given below. The polyol component is made by mixing the indicated ingredients in the amounts shown. The amounts of the ingredients employed in the polyol component are expressed in wt. percent based on the total weight of the polyol component.

| Polyol Component | Amount (wt. %) |
|---|---|
| Polyol A | 87.994 |
| MEG | 5.923 |
| Dabco T-12 | 0.010 |
| Dabco T-45 | 0.443 |
| Loxiol G71S | 5.130 |
| Kemeister 5721 | 0.500 |
| Total | 100.000 |
| Isocyanate: Isocyanate A | |
| Index: 550 | |

The polyol component at a temperature of 20° C., and the isocyanate at a temperature of 20° C. are supplied to the static mixer to produce a uniform reaction mixture. The reaction mixture is supplied under a pressure of 3.06 atm. from the mixer to the closed injection die while glass fiber reinforcement is supplied to the die at 350 mm/min. The temperature of the injection die is 15 C. The glass fiber reinforcement is supplied to the die in the form of glass rovings and mats to achieve 50% by weight of glass reinforcement in the pultruded polyisocyanurate composite. The glass fiber reinforcement is supplied in the form of six rovings on top, 48 rovings in the middle, and 6 rovings on the bottom. A glass fiber mat is present between the top roving and middle roving. The composite is sent to the curing die for curing. The curing die has a temperature profile of 260 C front section, 260 C middle section, and 260 C end section. Using a pull speed of 350 mm per minute and a pull force of 1 kilo newton, one meter of glass fiber reinforced polyisocyanurate material is pultruded during a period of 120 seconds.

EXAMPLE 12

This example illustrates pultrusion of a fiber reinforced pultruded polyisocyanurate type I miscible system using the polyol component given below, where all amounts are in parts by weight is made.

| Polyol Component | Amount |
| --- | --- |
| Polyol A | 87.4 |
| DPG | 12.6 |
| Dabco T-45 | 0.33 |
| LUWAX OP powder | 4.7 |
| Wurtz INT 6871 | 4.7 |
| TOTAL | 109.73 |
| Isocyanate D | |
| Index 450 | |

The machine settings and glass loadings are similar to those described in pultrusion example 11 with the exception that the supply pressure from the static mixer to the injection die is 4.76 atm. and the rate of glass fiber supply is 0.82 m/min. The temperature of the injection die is 10° C. The composite is sent to the curing die for curing. The curing die has a temperature profile of 140° C. front section, 140° C. middle section, and 140° C. end section. Using a pull speed of 0.5 mm/min and a pull force of 10 kN, 30 meters of glass fiber reinforced polyisocyanurate is pultruded during a period of one hour.

On the pultruded polyisocyanurate parts the flexural modulus is determined to be 24 GPa as determined by test method BS2782, pt10: MTD 1005 (1977. The inter laminar shear strength of the pultruded part is 33 MPA as determined by test method BS2783, pt3: MTD 341A (1977). The void content as determined by test method BS EN 2564 is 2.2%.

EXAMPLE 13

The isocyanate and polyol components below are supplied to the static mixer described above to produce a reaction mixture. All amounts in the polyol component are in parts by weight.

| Polyol Component | Parts by Weight |
| --- | --- |
| Polyol A | 87.4 |
| DPG | 12.6 |
| Dabco T-45 | 0.38 |
| LuWax OP | 4.7 |
| Wurtz PAT 672 | 4.7 |
| | 109.78 |
| Isocyanate: Isocyanate D 135 parts to 100 parts of the polyol component (450 Index) | |

The reaction mixture is supplied to the above-described pultrusion machine equipped with the above-described injection die and curing die. Reinforcement in the form of glass fibers is supplied to the injection die to achieve a glass fiber loading of about 56% glass by volume (68 tows, 1 continuous strand mat@450 g/m, and one continuous strand mat at 300 g/m). The injection die is maintained at 10° C., and the front, middle and end zones of the curing die each are at 140° C. The pull speed of the fibers is 0.1 m/min. Under these conditions, 762 cm of pultruded composite are formed over a period of 720 seconds.

EXAMPLE 14

The method of example 13 is repeated except that Wurtz INT 6871 is substituted for LuWax OP and Wurtz PAT 672. In addition, the amount of Dabco T-45 catalyst is reduced from 0.38 parts to 0.33 parts.

| Polyol Component | Parts by Weight |
| --- | --- |
| Polyol A | 87.4 |
| DPG | 12.6 |
| Dabco T-45 | 0.33 |
| Wurtz INT 6871 | 9.4 |
| | 109.73 |

The reaction mixture is supplied to the above-described pultrusion machine equipped with the above-described injection die and curing die. Reinforcement in the form of glass fibers is supplied to the injection die to achieve a glass fiber loading of about 42% glass by volume (48 tows, 2 continuous strand mats@450 g/m). The injection die is maintained at 10° C., and the front, middle and end zones of the curing die are at 140° C. The pull speed of the fibers is 0.5 m/min. Under these conditions, 82.3 meters of pultruded composite are formed over a period of 3 hours.

EXAMPLE 15

The method of example 14 is repeated except that LuWax OP is included in the polyol component as shown below.

| Polyol Component | Parts by Weight |
| --- | --- |
| Polyol A | 87.4 |
| DPG | 12.6 |
| Dabco T-45 | 0.33 |
| LuWax OP | 4.7 |
| Wurtz INT 6871 | 4.7 |
| | 109.73 |
| Isocyanate: Isocyanate D 135 parts to 100 parts of the polyol component (450 Index) | |

The reaction mixture is supplied to the above-described pultrusion machine equipped with the above-described injection die and curing die. Reinforcement in the form of glass fibers is supplied to the injection die to achieve a glass fiber loading of about 42% glass by volume (46 tows, 2 continuous strand mats@300 g/m, 8 textured tows). The injection die is maintained at 10° C., and the front, middle and end zones of the curing die are at 140° C. The pull speed of the fibers is 0.2 m/min. Under these conditions, 177.8 cm of pultruded composite are formed over a period of 600 seconds.

EXAMPLE 16

The method of example 15 is repeated except that Wurtz INT 6871 in the amount shown below is used in the POLYOL component.

| Polyol Component | Parts by Weight |
| --- | --- |
| Polyol A | 87.4 |
| DPG | 12.6 |
| Dabco T-45 | 0.33 |
| LuWax OP | 4.7 |

-continued

| Polyol Component | Parts by Weight |
|---|---|
| Wurtz INT 6871 | 9.4 |
| | 114.43 |
| Isocyanate: Isocyanate D 135 parts to 100 parts of the polyol component (450 Index) | |

The reaction mixture is supplied to the above-described pultrusion machine equipped with the above-described injection die and curing die. Reinforcement in the form of glass fibers is supplied to the injection die to achieve a glass fiber loading of about 42% glass by volume (62 tows, 2 continuous strand mats@300 g/m, 8 textured tows). The injection die is maintained at 10° C., and the front, middle and end zones of the curing die are at 160° C., 140° C. and 140° C. respectively. The pull speed of the fibers is 1.4 m/min. Under these conditions, 153.62 meters of pultruded composite are formed over a period of two hours.

EXAMPLE 17

In this example, the polyol component includes motor oil and Loxiol G71S as internal mold release agents.

| Polyol Component | Parts by Weight |
|---|---|
| Polyol A | 87.4 |
| DPG | 12.6 |
| Dabco T-45 | 0.38 |
| Loxiol G71S | 8.0 |
| Motor Oil | 8.0 |
| | 116.38 |
| Isocyanate: Isocyanate D | |
| Index: 450. | |

The reaction mixture is supplied to the above-described pultrusion machine equipped with the above-described injection die and curing die. Reinforcement in the form of glass fibers is supplied to the injection die to achieve a glass fiber loading of about 42% glass by volume (60 tows, 2 continuous strand mats@300 g/m, 8 textured tows). The injection die is maintained at 10° C., and the front, middle and end zones of the curing die are at 140° C., 140° C. and 140° C. respectively. The pull speed of the fibers is 0.1 m/min. Under these conditions, 330.98 meters of pultruded composite are formed over a period of four hours. The physical properties of the pultruded composite are shown in Table 7.

TABLE 7

Physical Properties of PIR Pultruded Composites

| Physical Property | ASTM Method | Units | PIR with C.M. and Roving | PIR with Roving |
|---|---|---|---|---|
| Specific Gravity | D-792 | — | 1.73 | 1.93 |
| Hardness | D-2240-95 | Shore D | 84.00 | 90.00 |
| Glass Content | D-2584-94 | % | 75.10 | 86.40 |
| HDT @ 66 psi | D-648-88 | ° C. | 269.00 | 266.17 |
| HDT @ 264 psi | D-648-88 | ° C. | 280.12 | 252.48 |
| CLTE | D-696 | $10 \times e^{-6}$ ° C. | 5.11 | N/D |
| Izod Parallel | D-256-93a | Ft-lbs/in | 40.6 | Sample split |

TABLE 7-continued

Physical Properties of PIR Pultruded Composites

| Physical Property | ASTM Method | Units | PIR with C.M. and Roving | PIR with Roving |
|---|---|---|---|---|
| Izod Perpendicular | D-256-93a | Ft-lbs/in | 13.4 | Sample split |
| Flexural Modulus (Parallel) | D-790-95A | $kg/cm^2$ | 116,475 | 271,730 |
| Flexural Modulus (Perpendicular) | D-790-95A | $kg/cm^2$ | 33323 | 37730 |
| Strain @ Break (Parallel) | D-790-95A | % | 2.9 | 2.1 |
| Strain @ Break (Perpendicular) | D-790-95A | % | 4.9 | 1.0 |
| Tensile Modulus | D-638-95 | $kg/cm^2$ | >304459 | 458407 |
| Tensile Strength | D-638-95 | $kg/cm^2$ | >3552 | 5823 |

In example 17, the motor oil is used as an internal mold release agent. The motor oil employed has the composition below:

| Material | % Weight |
|---|---|
| Base oil stock[1] | 71.5–96.2 |
| Metallic Detergent[2] | 2–10 |
| Ashless Dispersant[3] | 1–9 |
| Zinc Dithiophosphate | 0.5–3.0 |
| Antioxidant[4] | 0.1–2.0 |
| Friction Modifiers[5] | 0.1–3.0 |
| Antifoam[6] | 2–15 ppm |
| Pour Point Depression[7] | 0.1–1.5 |

[1]SAE 30 or 40 Base oil stock of petroleum based hydrocarbon with various molecular weight ($C_{10}$—$C_{19}$ fractions) which acts as lubricant
[2]Such as Sulfonates (Sodium Dodecyl sulfonate, Synthetic sulfonic acid), Phenates (Methylene coupled phenate) Salicylates (Alkyl Salicyclic Acid) and Phosphonates (Phosphonate, Thiopyrophosphate, Thiophosphonate
[3]Such as Succinimides (Polyisobutylene Succininc Anhydride, PBS), Hydroxyethyl imide, Succinate esters, Mannich type and Phosphorous type
[4]Diphenyl amines or Phosphites or hindered phenols are used
[5]Suspended graphite or, boric acid derivatives, chlorine containing materials, phosphorous compounds are used
[6]Typically, low molecular weight silicone type chemicals such as polymethyl siloxane are used
[7]Styrene/Maleic ester copolymers, polymethacrylates (not greater than 15000 Mn), Alkylated naphthalene, Alkylated wax phenols

EXAMPLE 18

The method of example 17 is repeated at 250 Index except that reaction mixture is applied by hand onto the reinforcement glass fibers and then pulled through the curing die. The fibers are in the form of 60 tows of a 450 weight roving and are used at a volume fraction of 65% of the composite. The curing die is 45.7 cm long and the cross section profile is 0.25"×0.21". The pull speed is about 30.5 cm/min. The front, middle and end zones of the curing die are at 125° C., 125° C. and 125° C. respectively. Under these conditions, 609.6 cm of pultruded composite are formed over a period of 1200 seconds.

EXAMPLE 19

The procedure of example 18 is repeated except that Isocyanate E is employed.

| Polyol Component | Parts by Weight |
|---|---|
| Polyol A | 87.4 |
| DPG | 12.6 |
| Dabco T-45 | 0.38 |
| Loxiol G71S | 8.0 |
| Motor Oil | 8.0 |
| | 116.38 |
| Isocyanate: Isocyanate E | |
| Index: 200 | |

Under those conditions, 609.6 cm of pultruded composite are formed over a period of 1200 seconds.

EXAMPLE 20

The procedure of example 19 is repeated except that the index is 400. Under these conditions, 609.6 cm of pultruded composite are formed over a period of 1200 seconds.

Pultrusion of Polyurethanes

In accordance with a further aspect of the invention, polyurethanes useful in manufacture of fiber reinforced polyurethane matrix composites by RIM and pultrusion are produced from immiscible and miscible polyurethane systems. In pultrusion of the polyurethane systems employed in the invention, the isocyanate and polyol components are supplied to a Cannon 2-component RIM machine for metering of these components to a static mixer. The minimum throughput of the RIM machine is about 4.5 gram/sec. The static mixer is equipped with 22 polypropylene elements and combines the components to provide a reaction mixture. The diameter of the mixer is 9.4 mm and its length is 185 mm. The pultrusion machine is the Pulstar 2408 machine configured with the closed injection die and a zoned curing die described above.

Immiscible Polyurethane Systems

EXAMPLE 21

In this example, an immiscible polyurethane system is employed. The polyol component and the isocyanate are given below. The amounts of the materials in the polyol component are expressed in wt. percent based on the total weight of the polyol component.

| Polyol Component | Amount |
|---|---|
| Polyol X | 80.96 |
| Glycerin | 4.26 |
| Dabco 33LV | 3.49 |
| Dabco T-12 | 0.32 |
| Unitol DSR | 4.86 |
| Loxiol G71S | 5.11 |
| Niax L-5440 | 0.43 |
| Kemester 5721 | 0.57 |
| Total | 100.00 |
| Isocyanate Component: Isocyanate A | |
| Index: 105 | |

Isocyanate A, at a temperature of 25° C. is added to the polyol component at a temperature of 25° C. to produce a reaction mixture. The reaction mixture is gently mixed by hand with a tongue depressor for 10 seconds without imparting shear force. Upon addition of isocyanate to the polyol, an immiscible reaction mixture is produced. As reaction of the isocyanate and polyol progresses, the reaction mixture becomes miscible and transparent. As the reaction proceeds further, the viscosity of the reaction mixture increases as the reaction mixture becomes translucent and then opaque at the gel point at 210 sec. at room temperature. This change in viscosity of the reaction mixture aids in wetting of glass fiber reinforcement.

Effect of Viscosity of Polyol

Table 8 shows the viscosity of the polyol component of example 21 at various temperatures. As the temperature increases, the viscosity of the polyol component decreases. This behavior helps thorough mixing of isocyanate with the polyol component to improve wetting of the reinforcement material.

TABLE 8

Viscosity of the Polyol Component vs. Temperature

| Temperature of Polyol ° C. | Viscosity (cps) |
|---|---|
| 25 | 200 |
| 32 | 158 |
| 40 | 105 |
| 45 | 95 |

Effect of Viscosity of Reaction Mixture on Gel Time

Table 9 shows the viscosity and gel times of the reaction mixture of example 21.

TABLE 9

Gel Time of Reaction Mixture vs. Temperature

| Temperature of Reaction Mixture ° C. | Gel Time (Sec.) |
|---|---|
| 25 | 47 |
| 32 | 39 |
| 40 | 31 |
| 45 | 22 |

Effect of Catalyst Blend on Gel Time

Table 10 shows the effect of catalyst blend on gel time of the reaction mixture of example 21 at various temperatures.

TABLE 10

Dabco 33 LV and Dabco T-12 catalyst (Parts by weight 1:0.1 ratio)

| Dabco 33 LV | Dabco T-12 | Gel (sec.) @ 25° C. | Gel (sec.) @ 35° C. | Gel (sec.) @ 60° C. | Gel (sec.) @ 80° C. |
|---|---|---|---|---|---|
| 0.000 | 0.000 | 440 | 254 | 101 | 38 |
| 0.082 | 0.008 | 345 | 250 | ND* | ND |
| 0.164 | 0.016 | 325 | 245 | ND | ND |
| 0.246 | 0.024 | 275 | 235 | ND | ND |
| 0.328 | 0.032 | 215 | 215 | ND | ND |
| 0.410 | 0.041 | 195 | 176 | ND | ND |
| 0.492 | 0.049 | 175 | 150 | 55 | 28 |
| 0.574 | 0.057 | 150 | 135 | ND | ND |
| 0.656 | 0.065 | 125 | 115 | ND | ND |
| 0.740 | 0.074 | 110 | 103 | ND | ND |
| 0.820 | 0.082 | 106 | ND | 35 | 15 |
| 1.220 | 0.122 | 103 | ND | 29 | 10 |
| 2.030 | 0.203 | 93 | 55 | ND | ND |
| 3.168 | 0.317 | 40 | 32 | 7 | 2 |

*ND = Not determined

Effect of a Single Catalyst on Gel Time

The gel time of the polyurethane reaction mixture of example 21 also can be controlled by varying the amount of Dabco 33 LV catalyst and the temperature of the reaction mixture. This is illustrated in Table 11.

TABLE 11

Effect of Dabco 33 LV Catalyst on Gel Time at Various Temperature

| Dabco 33 LV (g) | Gel time (sec.) @ 25° C. | Gel time (sec.) @ 40° C. |
|---|---|---|
| 0.0 | 902 | 176 |
| 0.28 | 875 | ND |
| 0.55 | 620 | 113 |
| 0.82 | 340 | ND |
| 1.10 | 245 | 62 |
| 1.37 | 170 | 48 |
| 2.73 | 64 | 24 |
| 4.10 | 40 | 15 |
| 5.47 | 33 | ND |
| 6.83 | 28 | 09 |

EXAMPLE 22

In another aspect of the invention, the polyurethane system below is modified with varying amounts of Dabco T-45 catalyst. All amounts of materials in the polyol component are expressed as percent by weight based on the total weight of the polyol component.

| Polyol Component | Amount |
|---|---|
| Polyol X | 82.6 |
| Glycerine | 4.35 |
| Zinc Stearate | 8.7 |
| L-5440 | 4.35 |
| Total | 100 |
| Isocyanate: Isocyanate A | |
| Index: 105 | |

The weight percent amounts of Dabco T-45 based on the total weight of the polyol component, and the effect of Dabco T-45 on the gel time of the system are shown in Table 12.

TABLE 12

Effect of Dabco T-45 on Gel Time

| Dabco T-45 (g) | Gel time (sec.) @ 25° C. | Gel time (sec.) @ 130° C. |
|---|---|---|
| 0.0 | did not cure | did not cure |
| 0.1 | 1800 | 160 |
| 0.2 | 710 | 130 |
| 0.3 | 380 | 120 |
| 0.5 | 270 | 100 |
| 1.0 | 200 | 100 |
| 2.0 | 110 | 79 |
| 3.0 | 89 | 40 |

EXAMPLE 23

The procedure of example 22 is repeated except that a mixture of Dabco T-45 and BiCat 8 is added to the polyol component. The effect of this mixture of catalysts on gel time at various temperatures of the reaction mixture with and without milled glass in the reaction mixture is shown in Table 13.

TABLE 13

Effect of mixture of Dabco T-45 and BiCat-8 Catalysts (1:1 Ratio) on Gel Time at Various Temperatures*

| Amount of Dabco T-45 and BiCat 8 | Gel @ 25° C. Without milled glass | Gel @ 25° C. with 50% milled glass | Gel @ 130° C. 0% milled glass | Gel @ 130° C. 50% milled glass |
|---|---|---|---|---|
| 0.1 (g) | 410 sec | 450 sec | 140 sec | 180 sec |
| 0.2 | 45 | 150 | 30 | 115 |

*Amount of milled glass based on weight of reaction mixture

EXAMPLES 24–24AK

In this aspect of the invention, LC 5615 and UAX 1075 catalysts are used in combination with internal mold release agents in the polyurethane system below. The amounts of the materials in the polyol component are expressed as wt. % based on total weight of the polyol component.

| Polyol Component | Amount |
|---|---|
| Polyol X | 84.82 |
| Glycerine | 4.46 |
| L-5440 | 0.45 |
| IMR* | 5.36 |
| LC 5615 | 0.45 |
| UAX 1075 | 4.46 |
| Total | 100.00 |

*Munch 7027/A, Munch 7016 or Munch 0669/1BB
Isocyanate: Isocyanate A
Index: 105

In these examples, varying amounts of LC 5615, UAX 1075, Munch 7027/A, Munch 7016 and Munch 0669/1BB are added to the polyol component. The effect of these catalysts and mold release agents on gel time of the polyurethane reaction mixture are given in Table 14:

TABLE 14

Effect on Gel Time Using Various IMRS at Various Temperature

| Ex. | Component/Temp. | LC 5615 (g) | UAX 1075 (g) | Munch 7027/A (g) | Munch 7016 (g) | Munch 0669/1BB (g) | Gel Time (sec) |
|---|---|---|---|---|---|---|---|
| 24A | 25 C. | 0.01 | 0.10 | 6 | — | — | 720 |
| 24B | 25 | 0.05 | 0.50 | 6 | — | — | 630 |
| 24C | 25 | 0.10 | 1.00 | 6 | — | — | 550 |
| 24D | 25 | 0.15 | 1.50 | 6 | — | — | 410 |
| 24E | 25 | 0.20 | 2.00 | 6 | — | — | 385 |
| 24F | 25 | 0.40 | 4.00 | 6 | — | — | 350 |
| 24G | 25 | 0.50 | 5.00 | 6 | — | — | 315 |
| 24H | 25 | 0.01 | 0.10 | — | 6 | — | 768 |
| 24I | 25 | 0.05 | 0.50 | — | 6 | — | 635 |
| 24J | 25 | 0.10 | 1.00 | — | 6 | — | 620 |
| 24K | 25 | 0.15 | 1.50 | — | 6 | — | 490 |
| 24L | 25 | 0.20 | 2.00 | — | 6 | — | 445 |
| 24M | 25 | 0.40 | 4.00 | — | 6 | — | 395 |
| 24N | 25 | 0.50 | 5.00 | — | 6 | — | 340 |
| 24P | 25 | 0.01 | 0.10 | — | — | 6 | 786 |
| 24Q | 25 | 0.05 | 0.50 | — | — | 6 | 750 |
| 24R | 25 | 0.10 | 1.00 | — | — | 6 | 615 |
| 24S | 25 | 0.15 | 1.50 | — | — | 6 | 520 |
| 24T | 25 | 0.20 | 2.00 | — | — | 6 | 470 |
| 24U | 25 | 0.40 | 4.00 | — | — | 6 | 385 |
| 24V | 25 | 0.50 | 5.00 | — | — | 6 | 360 |

TABLE 14-continued

Effect on Gel Time Using Various IMRS at Various Temperature

| Ex. | Component/ Temp. | LC 5615 | UAX 1075 | Munch 7027/A | Munch 7016 | Munch 0669/1BB | Gel Time |
|---|---|---|---|---|---|---|---|
| 24W | 140 | 0.01 | 0.10 | 6 | — | — | 185 |
| 24X | 140 | 0.05 | 0.50 | 6 | — | — | 174 |
| 24Y | 140 | 0.10 | 1.00 | 6 | — | — | 160 |
| 24Z | 140 | 0.15 | 1.50 | 6 | — | — | 140 |
| 24AA | 140 | 0.20 | 2.00 | 6 | — | — | 125 |
| 24AB | 140 | 0.40 | 4.00 | 6 | — | — | 120 |
| 24AC | 140 | 0.50 | 5.00 | 6 | — | — | 98 |
| 24AD | 140 | 0.01 | 0.10 | — | 6 | — | 210 |
| 24AE | 140 | 0.05 | 0.50 | — | 6 | — | 196 |
| 24AF | 140 | 0.10 | 1.00 | — | 6 | — | 160 |
| 24AG | 140 | 0.15 | 1.50 | — | 6 | — | 140 |
| 24AH | 140 | 0.20 | 2.00 | — | 6 | — | 125 |
| 24AI | 140 | 0.40 | 4.00 | — | 6 | — | 105 |
| 24AJ | 140 | 0.50 | 5.00 | — | 6 | — | 95 |
| 24AK | 140 | 0.01 | 0.10 | — | — | 6 | 216 |
| 24AL | 140 | 0.05 | 0.50 | — | — | 6 | 200 |
| 24AM | 140 | 0.10 | 1.00 | — | — | 6 | 185 |
| 24AN | 140 | 0.15 | 1.50 | — | — | 6 | 160 |
| 24AP | 140 | 0.20 | 2.00 | — | — | 6 | 130 |
| 24AQ | 140 | 0.40 | 4.00 | — | — | 6 | 115 |
| 24AR | 140 | 0.50 | 5.00 | — | — | 6 | 954 |

EXAMPLES 25A–25AS

The process of example 24 is repeated except that the amounts of Munch and Loxiol are held constant and the amounts of LC 5615 and UAX 1075 are varied. All amounts below are expressed in weight percent based on total weight of the polyol component.

| Component | Amount |
|---|---|
| Polyol X | 80.50 |
| Glycerine | 4.10 |
| L 5440 | 0.40 |
| Loxiol | 5.15 |
| Munch IMR* | 5.15 |
| LC 5615 | 0.40 |
| UAX 1075 | 4.30 |
| Total | 100.00 |

*Munch 7027/A, Munch 7016 or Munch 0669/1BB
Isocyanate: Isocyanate A
Index: 105

The effects on gel time of these internal mold release agents are shown in Table 15.

TABLE 15

Effect on Gel Time Using Various IMRS at Various Temperature

| Ex. | Component/ Temp | LC 5615 | UAX 1075 | Munch 7027/A: Loxiol | Munch 7016: Loxiol | Munch 0669/1BB: Loxiol | Gel Time |
|---|---|---|---|---|---|---|---|
| 25A | 25 C. | 0.01 (g) | 0.1 (g) | 6:6 (g) | — (g) | — (g) | 740 (sec) |
| 25B | 25 | 0.05 | 0.5 | 6:6 | — | — | 650 |
| 25C | 25 | 0.10 | 1.0 | 6:6 | — | — | 580 |
| 25D | 25 | 0.15 | 1.5 | 6:6 | — | — | 430 |
| 25E | 25 | 0.20 | 2.0 | 6:6 | — | — | 398 |
| 25F | 25 | 0.40 | 4.0 | 6:6 | — | — | 368 |
| 25G | 25 | 0.50 | 5.0 | 6:6 | — | — | 315 |
| 25H | 25 | 0.01 | 0.1 | — | 6:6 | — | 795 |
| 25I | 25 | 0.05 | 0.5 | — | 6:6 | — | 656 |
| 25J | 25 | 0.10 | 1.0 | — | 6:6 | — | 605 |
| 25K | 25 | 0.15 | 1.5 | — | 6:6 | — | 510 |
| 25L | 25 | 0.20 | 2.0 | — | 6:6 | — | 465 |
| 25M | 25 | 0.40 | 4.0 | — | 6:6 | — | 418 |
| 25N | 25 | 0.50 | 5.0 | — | 6:6 | — | 368 |
| 25P | 25 | 0.01 | 0.1 | — | — | 6:6 | 810 |
| 25Q | 25 | 0.05 | 0.5 | — | — | 6:6 | 750 |
| 25R | 25 | 0.10 | 1.0 | — | — | 6:6 | 665 |
| 25S | 25 | 0.15 | 1.5 | — | — | 6:6 | 586 |
| 25T | 25 | 0.20 | 2.0 | — | — | 6:6 | 496 |
| 25U | 25 | 0.40 | 4.0 | — | — | 6:6 | 410 |
| 25V | 25 | 0.50 | 5.0 | — | — | 6:6 | 385 |
| 25W | 140 | 0.01 | 0.1 | 6:6 | — | — | 199 |
| 25X | 140 | 0.05 | 0.5 | 6:6 | — | — | 180 |
| 25Y | 140 | 0.10 | 1.0 | 6:6 | — | — | 172 |
| 25Z | 140 | 0.15 | 1.5 | 6:6 | — | — | 156 |
| 25AA | 140 | 0.20 | 2.0 | 6:6 | — | — | 135 |
| 25AB | 140 | 0.40 | 4.0 | 6:6 | — | — | 128 |
| 25AC | 140 | 0.50 | 5.0 | 6:6 | — | — | 110 |
| 25AD | 140 | 0.01 | 0.1 | — | 6:6 | — | 225 |
| 25AE | 140 | 0.05 | 0.5 | — | 6:6 | — | 210 |
| 25AF | 140 | 0.10 | 1.0 | — | 6:6 | — | 186 |
| 25AG | 140 | 0.15 | 1.5 | — | 6:6 | — | 155 |
| 25AH | 140 | 0.20 | 2.0 | — | 6:6 | — | 130 |
| 25AJ | 140 | 0.40 | 4.0 | — | 6:6 | — | 115 |
| 25AK | 140 | 0.50 | 5.0 | — | 6:6 | — | 102 |
| 25AL | 140 | 0.01 | 0.1 | — | — | 6:6 | 229 |
| 25AM | 140 | 0.05 | 0.5 | — | — | 6:6 | 210 |
| 25AN | 140 | 0.10 | 1.0 | — | — | 6:6 | 196 |
| 25AP | 140 | 0.15 | 1.5 | — | — | 6:6 | 181 |
| 25AQ | 140 | 0.20 | 2.0 | — | — | 6:6 | 162 |
| 25AR | 140 | 0.40 | 4.0 | — | — | 6:6 | 140 |
| 25AS | 140 | 0.50 | 5.0 | — | — | 6:6 | 124 |

Preferably, about 0.40 gram of LC 5615 and about 4.0 gram UAX 1075 are used per 100 gram of polyol component. More preferably, about 0.35 gram of LC 5615 and about 1.5 gram UAX 1075 are used per 100 gram of polyol component.

Polyurethane Systems with Internal Mold Release Agents

EXAMPLE 26

In this aspect of the invention, LC 5615 and UAX 1075 catalysts are used in combination with internal mold release agents. The amounts of the materials in the polyol component are expressed as weight percent based on the total weight of the polyol component.

| Polyol Component | Amount |
|---|---|
| Polyol X | 77.18 |
| UAX 1075 | 1.05 |
| LC-5615 | 1.46 |
| DPG | 16.25 |
| Munch 7027/A | 4.06 |
| Total | 100.00 |

Isocyanate: Isocyanate D
Index: 105

The polyurethane polymer produced from this polyurethane system hardens at 6.5 min. at room temperature and cures in less than one minute at 300 F. on a hot plate.

EXAMPLE 27

In this example, LC 5615 and UAX 1075 catalysts are used in combination with internal mold release agents in the polyurethane system below. The amounts of the components in the polyol component are expressed as weight percent based on the total weight of the polyol component.

| Polyol Component | Amount |
| --- | --- |
| PPG 425 | 60.60 |
| UAX 1075 | 0.98 |
| LC-5615 | 1.15 |
| DPG | 31.90 |
| Munch 7027/A | 4.88 |
| LC-5440 | 0.49 |
| Total | 100.00 |

Isocyanate: Isocyanate D
Index: 105

The polyurethane polymer produced from this polyurethane system hardens at 5.0 min. at room temperature and cures in 30 seconds at 300 F on a hot plate. The reaction mixture produced from this polyurethane system is completely miscible visually after 20–25 seconds on addition of the isocyanate to the polyol component and mixing by hand with a tongue depressor with low shear force.

EXAMPLE 28

The procedure of example 27 is followed except that LHT 240 is substituted for PPG 425. The polyurethane polymer produced from this polyurethane system hardens at six min. at room temperature cures in 30 seconds at 300 F. on a hot plate. The reaction mixture produced from this polyurethane system is completely miscible visually after 20–25 seconds on addition of the isocyanate to the polyol component and mixing by hand with a tongue depressor with low shear force.

Polyurethane Systems with Internal Mold Release Agents and Catalysts

EXAMPLE 29

In this example, LC 5615 and UAX 1075 catalysts are used in combination with internal mold release agents in the polyurethane system below. The amounts of the materials in the polyol component are expressed as weight percent based on the total weight of the polyol component.

| Polyol Component | Amount |
| --- | --- |
| Polyol X | 15.50 |
| Polyol Y | 15.50 |
| LHT 240 | 46.50 |
| UAX 1075 | 1.50 |
| LC-5615 | 1.50 |
| DPG | 18.50 |
| Munch 7027/A | 0.65 |
| L-5440 | 0.35 |
| Total | 100.00 |

Isocyanate: Isocyanate D
Index: 105

The polyurethane polymer produced from this polyurethane system hardens at six min. at room temperature and cures in 20 seconds at 300 F. on a hot plate. The reaction mixture produced from this polyurethane system is completely miscible visually after 50 seconds on addition of the isocyanate to the polyol component and mixing by hand with a tongue depressor with low shear force.

EXAMPLE 30

In this example, a two component immiscible polyurethane system is pultruded. The polyol component and the isocyanate are given below. The amounts of the materials employed in the polyol component are expressed in wt. percent based on the total weight of the polyol component.

| Polyol Component | Amount |
| --- | --- |
| Polyol X | 68.98 |
| Glycerin | 3.63 |
| Dabco DC 1027 | 0.36 |
| Fomrez UL-29 | 0.04 |
| Loxiol G71S | 4.36 |
| Niax L-5440 | 0.36 |
| Kemester 5721 | 0.49 |
| Zinc Stearate | 7.26 |
| Kaolin (Clay) | 14.52 |
| Total | 100.00 |

Isocyanate: Isocyanate A
Index: 103

In this example, the polyol component at a temperature of 25° C. and isocyanate at a temperature of 25° C. are reacted in the closed injection die described above in the presence of glass fiber reinforcement and pultruded to produce glass fiber reinforced polyurethane composites.

EXAMPLE 30A

The polyol component employed in example 30 having a hydroxyl value of 471, water content of 0.28%, and a viscosity of 2759 cps, and Isocyanate A are supplied to a static mixer at a weight ratio of isocyanate to polyol component of 1.27 to produce a reaction mixture. The time for the initiation of reaction mixture to form a gel and to cure to hardness at room temperature and on a hot plate heated to 200° C. is shown in Table 16.

TABLE 16

| Initiation of Reaction to Form Gel[1] | Gelling Stage | Hardening Stage | Temperature |
| --- | --- | --- | --- |
| 7.1–7.15 Min. | 8.25–8.3 Min. | 9.1–9.2 Min. | 25° C. |
| 2.1–2.15 | 3.25–3.3 | 4.1–4.2 | 200 on a Hot Plate |

[1]Visual Inspection

The reaction mixture produced in the static mixture is injected at 3.06 atm. into the injection die shown in U.S. Pat. No. 5,783,013 while glass fiber reinforcement is supplied to the die. The glass fiber reinforcement is supplied to the die as a set of top, middle and bottom 366 Type 30 rovings from Owens Coming Fiberglass Co. to achieve 40–45% by weight of glass reinforcement in the pultruded product. The top and bottom rovings include four layers of 16 rows of tows in each roving. Each tow includes about 4000 filaments which are sized with aminosilane. The middle layer includes four layers of continuous strand glass mat at an areal density of about 0.78 gm/cm$^2$ of M8643 glass fibers from Owens Coming Fiberglass Co, each of which are separated by a single layer of 16 rows of tows. Each tow includes about 4000 filaments which are sized with aminosilane.

Using a pull force of 3558–5338 newton, and a pull speed of 35.56 cm per minute, the reaction mixture with glass fiber reinforcement is pultruded through the injection die at 25° C. to the curing die. The front, middle and end portions of the curing die are at the temperatures below:

|  | Front | Middle | End |
|---|---|---|---|
| Upper Mold of the Die | 220° C. | 215° C. | 217° C. |
| Lower Mold of the Die | 219° C. | 216° C. | 218° C. |

Under these conditions, 355.6 cm of pultruded glass fiber reinforced polyurethane composite is pultruded during a period of 900 seconds.

EXAMPLE 31

The procedure of example 30A is repeated except that the front, middle and end portions of the injection die are heated to the temperatures below:

|  | Front | Middle | End |
|---|---|---|---|
| Upper Mold of the Die | 240° C. | 246° C. | 220° C. |
| Lower Mold of the Die | 240° C. | 246° C. | 220° C. |

Under these conditions, 355.6 cm of pultruded glass fiber reinforced polyurethane composite is pultruded during a period of 1200 seconds.

EXAMPLE 32

The procedure of example 30A is repeated except that the amount of glass fiber reinforcement is increased to 45–50% by weight of the pultruded product. Under these conditions, 533.4 cm of pultruded glass fiber reinforced polyurethane composite is pultruded during a period of 1800 seconds.

EXAMPLE 33

The procedure of example 32 is repeated except that the amount of glass fiber is increased to 50–55% by weight of the pultruded product. Under these conditions, 355.6 cm of pultruded glass fiber reinforced polyurethane composite is pultruded during a period of 1800 seconds.

EXAMPLE 34

The procedure of Example 33 is repeated except that the pull force is 4448–6227 newton, the pull speed is 40.6 cm per minute, and the front, middle and end portions of the die are heated to the temperatures below:

|  | Front | Middle | End |
|---|---|---|---|
| Upper Mold of the Die | 260° C. | 260° C. | 220° C. |
| Lower Mold of the Die | 260° C. | 260° C. | 220° C. |

Under these conditions, 533.4 cm of pultruded glass fiber reinforced polyurethane composite is pultruded during a period of 840 seconds.

EXAMPLE 35

The procedure of example 34 is repeated except that the pull speed is 61 cm per minute. Under these conditions, 533.4 cm of pultruded glass fiber reinforced polyurethane composite is pultruded during a period of 720 seconds.

EXAMPLE 36

The procedure of example 35 is repeated except that the pull speed is 76.2 cm per minute, and the amount of glass fiber reinforcement is increased to 60–65% by weight of the pultruded product. Under these conditions, 22.86 meters of pultruded glass fiber reinforced polyurethane composite is pultruded during a period of 1800 seconds.

Table 17 shows the properties of the glass fiber reinforced polyurethane composite pultruded at pull speed of 76.2 cm per minute.

TABLE 17

| Property | ASTM Method | Units | Parallel to Fiber Alignment | Perpendicular to Fiber Alignment |
|---|---|---|---|---|
| Amount of glass fiber by weight | — | % | 70 | 70 |
| Specific Gravity | D 792 | — | 1.43 | 1.44 |
| Flexural Modulus | D 790 | Psi | 3,460,000 | 330,000 |
| Stress @ Break | D 790 | Psi | 42,000 | 6,870 |
| Strain @ Break | D 790 | % | 1.6 | 4 |
| Izod Impact @ 73 °F | D 256 Notched | ft lbs/in | 33.54 | 6.64 |
| Tensile Modulus | D 638 | Psi | 3,500,000 | 543,000 |
| Tensile Stress @ Break | D 638 | Psi | 48,000 | 8,730 |
| Tensile Strain @ Break | D 638 | % | 0* | 2.24 |
| CLTE | D 696 | C | 3.6 | 13.8 |
| HDT @ 264 Psi | D 648 | C | 249 | 175 |
| HDT @ 66 Psi | D 648 | C | 260 | 222 |
| Water Absorption | D 570 | % | 2.11 | 1.43 |

*Not measured

The invention provides numerous advantages. For example, increased pull speeds through control of the reaction rate of the polyisocyanurate reaction mixture in both the injection die and the curing die. The invention, through use of a static mixer, also enables increased exposure times of the reaction mixture to the glass fiber reinforcement in the injection die to more thoroughly wet the glass fiber reinforcement. In addition, the polyisocyanurates of the invention provide fast reactions and enable high production rates, but produce products which have flexural strengths comparable to polyester and much greater flexibility than polyester.

The polyisocyanurate systems of the invention advantageously can be tailored to achieve a wide range of initiation times to facilitate pultrusion of polyisocyanurates and fiber reinforced polyisocyanurate matrix composites over a broad range of pultrusion line speeds.

The polyisocyanurate systems of the invention advantageously have extended initiation times of about 5 minutes to about 30 minutes at room temperature, and can be snap cured. These characteristics aid wetting of glass fiber reinforcement and production of high strength, uniform fiber reinforced polyisocyanurate matrix composites.

We claim:

1. A pultrusion process for preparing a cured fiber reinforced composite comprising the steps of:
   a) pulling continuous fibers through an impregnation die;
   b) supplying a polyol component and a polyisocyanate component to produce a reaction mixture and feeding the reaction mixture to the impregnation die;
   c) contacting the fibers with the reaction mixture in the impregnation die for a time period and at a temperature sufficient to cause substantial polymerization of the reaction mixture within the impregnation die to produce a composite of fibers coated by the reaction mixture;

d) directing the composite of coated fibers through a heated curing die to at least partially advance the cure of the reaction mixture so as to produce a solid fiber reinforced polymer matrix; and e) drawing the solid composite from the curing die, wherein the reaction mixture gels between 340 and 768 seconds at 25° C. and between 95 and 210 seconds at 140° C.

2. The pultrusion process according to claim 1, wherein the polyol component and the isocyanate component are mixed using a static mixer.

3. The pultrusion process according to claim 1, wherein the polyol component contains one or more catalysts suitable for promoting at least one reaction selected from the group consisting of the reaction of isocyanate groups with alcohol groups to form urethane bonds, and the trimerization of isocyanate groups to form isocyanurate groups.

4. The pultrusion process according to claim 1, wherein the fibers and the reaction mixture are supplied concurrently to the impregnation die.

5. The pultrusion process according to claim 1, wherein the curing die includes a plurality of zones having different temperatures.

6. The pultrusion process according to claim 1, wherein the polyol component and the polyisocyanate component are mixed at an isocyanate index of from 200 to 1000, and the polyol component contains at least one catalyst for the trimerization of isocyanate groups.

7. The pultrusion process according to claim 1, wherein an isocyanate index of the reaction mixture is less than 200.

8. The pultrusion process according to claim 1, wherein the reaction mixture contains phosphate release agent.

9. The pultrusion process according to claim 1, wherein the polyol component comprises an aromatic polyester polyol.

10. The pultrusion process according to claim 1, wherein the polyisocyanate component comprises isocyanate terminated prepolymer.

11. A pultrusion process for preparing a cured fiber reinforced composite comprising the steps of:

a) pulling continuous fibers through an impregnation die;

b) supplying a polyol component and a polyisocyanate component to produce a reaction mixture and feeding the reaction mixture to the impregnation die;

c) contacting the fibers with the reaction mixture in the impregnation die for a time period and at a temperature sufficient to cause substantial polymerization of the reaction mixture within the impregnation die to produce a composite of fibers coated by the reaction mixture;

d) directing the composite of coated fibers through a heated curing die to at least partially advance the cure of the reaction mixture so as to produce a solid fiber reinforced polymer matrix; and e) drawing the solid composite from the curing die, wherein the reaction mixture contains release agent selected from the group consisting of fatty amides, fatty esters, fatty acids, and mixtures thereof.

12. A pultrusion process for preparing a cured fiber reinforced composite comprising the steps of:

a) pulling continuous fibers through an impregnation die;

b) supplying a polyol component and a polyisocyanate component to produce a reaction mixture and feeding the reaction mixture to the impregnation die;

c) contacting the fibers with the reaction mixture in the impregnation die for a time period and at a temperature sufficient to cause substantial polymerization of the reaction mixture within the impregnation die to produce a composite of fibers coated by the reaction mixture;

d) directing the composite of coated fibers through a heated curing die to at least partially advance the cure of the reaction mixture so as to produce a solid fiber reinforced polymer matrix; and e) drawing the solid composite from the curing die, wherein the reaction mixture contains release agent selected from the group consisting of erucamide, stearamide, oleic acid, one or more fatty ester reaction products of adipic acid with petaerythritol and oleic acid, the reaction products having acid number less than 15 and hydroxyl number less than 15, carnuba wax, beeswax, butyl stearate, octyl stearate, ethylene glycol monostearate, ethylene glycol distearate, glycerine monooleate, dioctyl sebacate, one or more metal carboxylates, one or more silicones, montan wax, one or more hydrocarbons having from 10 to 19 carbon atoms, polytetrafluoroethylene, one or more phosphates, one or more chlorinated phosphates, and mixtures thereof.

13. The pultrusion process according to claim 12, wherein the release agent comprises at least one member selected from the group consisting of zinc stearate and calcium stearate.

14. The pultrusion process according to claim 12, wherein the reaction mixture is devoid of amines.

15. The pultrusion process according to claim 12, wherein the polyol component and the polyisocyanate component are mixed at an isocyanate index of from 200 to 1000, and the polyol component contains at least one catalyst for the trimerization of isocyanate groups.

16. The pultrusion process according to claim 15, wherein the reaction mixture comprises aromatic polyester polyol.

17. The pultrusion process according to claim 15, wherein the polyisocyanate component comprises isocyanate terminated prepolymer.

18. The pultrusion process according to claim 12, wherein the reaction mixture comprises aromatic polyester polyol.

19. The pultrusion process according to claim 12, wherein the polyisocyanate component comprises isocyanate terminated prepolymer.

20. A pultrusion process for preparing a cured fiber reinforced composite comprising the steps of:

a) pulling continuous fibers through an impregnation die;

b) supplying a polyol component and a polyisocyanate component to produce a reaction mixture and feeding the reaction mixture to the impregnation die;

c) contacting the fibers with the reaction mixture in the impregnation die for a time period and at a temperature sufficient to cause substantial polymerization of the reaction mixture within the impregnation die to produce a composite of fibers coated by the reaction mixture;

d) directing the composite of coated fibers through a heated curing die to at least partially advance the cure of the reaction mixture so as to produce a solid fiber reinforced polymer matrix; and e) drawing the solid composite from the curing die, wherein the reaction mixture has a gel time in the range of 84 to 600 seconds when maintained at 23° C., and the reaction mixture cures within 1 minute when heated to a cure temperature in the range of 120 to 140° C.

21. The pultrusion process according to claim 20, wherein the polyol component comprises polyester polyol.

22. A pultrusion process for preparing a cured fiber reinforced composite comprising the steps of:
   a) pulling continuous fibers through an impregnation die;
   b) supplying a polyol component and a polyisocyanate component to produce a reaction mixture and feeding the reaction mixture to the impregnation die;
   c) contacting the fibers with the reaction mixture in the impregnation die for a time period and at a temperature sufficient to cause substantial polymerization of the reaction mixture within the impregnation die to produce a composite of fibers coated by the reaction mixture;
   d) directing the composite of coated fibers through a heated curing die to at least partially advance the cure of the reaction mixture so as to produce a solid fiber reinforced polymer matrix; and
   e) drawing the solid composite from the curing die, wherein the polyol component contains a catalyst for the trimerization of isocyanate groups, the polyol component and the polyisocyanate component are combined to produce an isocyanate index of between 300 and 900, the reaction mixture has a gel time in the range of 84 to 600 seconds when maintained at 23° C., and the reaction mixture cures within 1 minute when heated to a cure temperature in the range of 120 to 140° C.

23. The pultrusion process according to claim 22, wherein the polyol component comprises polyester polyol.

* * * * *

UNITED STATES PATENT AND TRADEMARK OFFICE
CERTIFICATE OF CORRECTION

PATENT NO. : 6,793,855 B2
DATED : September 21, 2004
INVENTOR(S) : Evan H. Cheolas et al.

It is certified that error appears in the above-identified patent and that said Letters Patent is hereby corrected as shown below:

<u>Title page,</u>
Item [75], Inventor, please add -- Alan McClelland, Ajay Padsalgikar, and Andreas H. Rothacker --.

Signed and Sealed this

Eighth Day of March, 2005

JON W. DUDAS
*Director of the United States Patent and Trademark Office*